United States Patent
Olijnyk et al.

(10) Patent No.: US 7,172,298 B2
(45) Date of Patent: Feb. 6, 2007

(54) POWER FOLD MECHANISM FOR VEHICLE MIRRORS

(75) Inventors: Mark Olijnyk, Hallett Cove (AU); Daniel J. Flynn, Morphett Vale (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 0 days.

(21) Appl. No.: 11/236,939

(22) Filed: Sep. 28, 2005

(65) Prior Publication Data

US 2006/0103957 A1    May 18, 2006

Related U.S. Application Data

(63) Continuation-in-part of application No. 11/174,695, filed on Jul. 5, 2005, which is a continuation of application No. 10/467,201, filed as application No. PCT/AU02/00517 on Apr. 29, 2002, now Pat. No. 6,929,372.

(30) Foreign Application Priority Data

Apr. 27, 2001 (AU) .................................. PR 4613

(51) Int. Cl.
G02B 7/182 (2006.01)
B60R 1/06 (2006.01)

(52) U.S. Cl. ...................................... 359/841; 359/877

(58) Field of Classification Search ................ 359/841, 359/872, 877
See application file for complete search history.

(56) References Cited

U.S. PATENT DOCUMENTS

| 4,558,930 A | | 12/1985 | Deedreek | |
|---|---|---|---|---|
| 4,692,000 A | * | 9/1987 | Wada et al. ................ | 359/841 |
| 4,919,526 A | * | 4/1990 | Umekawa et al. .......... | 359/841 |
| 4,982,926 A | * | 1/1991 | Mori et al. ................. | 248/479 |
| 5,375,014 A | | 12/1994 | Fujie et al. | |
| 5,636,071 A | * | 6/1997 | Mochizuki et al. ......... | 359/877 |
| 5,867,328 A | * | 2/1999 | Stapp et al. ................ | 359/841 |
| 5,886,838 A | | 3/1999 | Kuramoto | |
| 5,926,331 A | | 7/1999 | Crandall | |
| 5,940,230 A | | 8/1999 | Crandall | |

(Continued)

FOREIGN PATENT DOCUMENTS

JP          08072613    *  3/1996

(Continued)

*Primary Examiner*—Ricky D. Shafer
(74) *Attorney, Agent, or Firm*—Warn, Hoffmann, Miller & LaLone, P.C.

(57) ABSTRACT

A power-folding vehicle mirror assembly is described, including: a base; a mirror head assembly mounted to the base for movement from a drive position to a front position and for movement from the drive position to a park position; a first clutch body mounted to the base; a second clutch body mounted to the head, and biased towards engagement with the first clutch body; a sun gear mounted to the base for rotation about a first axis; a planetary gear mounted to the mirror head assembly for rotation about a second axis; a motor operably connected to the planetary gear; at least one drive train detent recess and projection pair forming a drive train detent system; and a head assembly to base detent system operably interposed between the head assembly and the base, wherein the mirror head is moveable between a drive position and a park position.

20 Claims, 21 Drawing Sheets

U.S. PATENT DOCUMENTS

| | | | |
|---|---|---|---|
| 6,022,113 A * | 2/2000 | Stolpe et al. | 359/841 |
| 6,116,743 A | 9/2000 | Hoek | |
| 6,130,514 A * | 10/2000 | Oesterholt et al. | 318/438 |
| 6,133,704 A * | 10/2000 | Yoshida et al. | 318/466 |
| 6,213,609 B1 | 4/2001 | Foote et al. | |
| 6,239,928 B1 | 5/2001 | Whitehead et al. | |
| 2,243,218 A1 | 6/2001 | Whitehead | |
| 6,276,805 B1 | 8/2001 | Horne et al. | |
| 6,276,808 B1 | 8/2001 | Foote et al. | |
| 6,276,821 B1 | 8/2001 | Pastrick et al. | |
| 6,312,135 B1 | 11/2001 | Polzer | |
| 6,322,221 B1 | 11/2001 | van de Loo | |
| 6,325,518 B1 | 12/2001 | Whitehead et al. | |
| 6,390,635 B2 | 5/2002 | Whitehead et al. | |
| 6,394,616 B1 | 5/2002 | Foote et al. | |
| 6,439,730 B1 | 8/2002 | Foote et al. | |
| 6,497,491 B2 | 12/2002 | Boddy et al. | |
| 6,505,943 B1 | 1/2003 | Olijnyk et al. | |
| 6,582,087 B2 | 6/2003 | Whitehead et al. | |
| 6,637,898 B2 * | 10/2003 | Hattori et al. | 359/841 |
| 6,726,337 B2 | 4/2004 | Whitehead et al. | |
| 6,755,543 B1 | 6/2004 | Foote et al. | |
| 6,793,358 B2 * | 9/2004 | Sakata | 359/872 |
| 6,848,816 B2 | 2/2005 | Gilbert et al. | |
| 6,874,896 B2 * | 4/2005 | Yoshida | 359/841 |
| 6,877,868 B2 | 4/2005 | Olijnyk et al. | |
| 6,929,372 B2 | 8/2005 | Olijnyk et al. | |
| 7,008,067 B2 * | 3/2006 | Hsu | 359/841 |
| 2001/0046093 A1 | 11/2001 | Foote et al. | |

FOREIGN PATENT DOCUMENTS

| | | | |
|---|---|---|---|
| JP | 10081175 | * | 3/1998 |
| JP | 10129349 | * | 5/1998 |
| JP | 2000085470 | * | 3/2000 |
| JP | 2004082953 | * | 3/2004 |
| WO | WO 00/78573 A | | 12/2000 |
| WO | WO 01/28812 A | | 4/2001 |

* cited by examiner

POWER FOLD MECHANISM FOR VEHICLE MIRRORS

CROSS-REFERENCE TO RELATED APPLICATION

The instant application is a Continuation-In-Part of U.S. patent application Ser. No. 11/174,695, filed Jul. 5, 2005, which is a Continuation of U.S. patent application Ser. No. 10/476,201, now U.S. Pat. No. 6,929,372 filed Oct. 24, 2003, which is a national stage of International Application No PCT/AU02/00517, filed Apr. 29, 2002, which claims priority to Australian Patent Application No PR 4613, filed on Apr. 27, 2001, the specifications of all of which are expressly incorporated herein by reference.

FIELD OF THE INVENTION

The present invention relates generally to power fold mechanisms for external rear vision mirrors for motor vehicles and more particularly to mirrors of the double arm type.

BACKGROUND OF THE INVENTION

For larger motor vehicles and small trucks it is desirable to have a large rear vision mirror and these are known to be mounted on a double arm system where the arms extend from a mirror base to a large mirror head.

However, it is sometimes desirable that the width of a vehicle with such mirrors may be reduced and hence it is known to have such arms pivoting about a pivot axis substantially within the base so that the mirror can be folded back against the side of the vehicle to reduce the overall width.

Furthermore, it is desirable that such a folding mechanism be power operated to avoid the necessity of an operator opening a window, perhaps in adverse weather conditions, to fold the mirror. In other situations where the vehicle must fit through or into tight situations such as parking, or garaging a vehicle, or washing and drive through services, it is also desirable to have a power operated folding mechanism to avoid the necessity for a driver to have to get out of the vehicle to fold the mirror on the passenger side as well as the driver' side.

Accordingly, there exists a need for new and improved power fold systems for use in conjunction with automotive mirror assemblies.

SUMMARY OF THE INVENTION

It is an object of this invention to provide such a power fold system. It is a further object of the invention to provide a mirror assembly that is lockable in both a drive position and a parked position.

According to a first aspect of the invention, there is provided a power-folding vehicle mirror assembly, comprising: (1) a base mountable to a vehicle; (2) a mirror head assembly rotatably mounted to the base for forward rotational movement from a drive position to a front position and for rearward rotational movement from the drive position to a park position; (3) a first clutch body mounted to and rotationally fixed with respect to the base; (4) a second clutch body mounted to the head, the second clutch body biased towards engagement with the first clutch body by a spring; (5) a sun gear mounted to the base for rotation about a first axis and mounted to or integral with the second clutch body for rotation therewith; (6) a planetary gear mounted to the mirror head assembly for rotation about a second axis, the planetary gear meshing with the sun gear; (7) a motor operably connected to the planetary gear thereby providing a gear train for driving the mirror head assembly around the sun gear, the gear train being non-back-driveable; (8) at least one drive train detent recess and projection pair forming a drive train detent system, the projection extending from the first clutch body and the recess within the second clutch body, the projection comprising a back-to-back ramp pair, one of the ramps of the pair providing a rearward rotation detent and the other of the ramps of the pair providing a forward rotation detent, the recess bounded by a rearward rotation recess end face and a forward rotation recess end face, the recess oversized relative to the/their corresponding projection such that rotational slip can occur with changes in rotational direction of the first clutch body with respect to the second clutch body; and (9) a head assembly to base detent system operably interposed between the head assembly and the base, wherein the mirror head is manually moveable and motor moveable between: (a) a drive position in which rearward rotation of the head assembly is restrained by the drive train detent system and forward rotation is restrained by the head assembly to base detent system; and (b) a park position in which forward rotation of the head assembly is restrained by the drive train detent system and rearward rotation is restrained by the head assembly to base detent system.

In the drive position, rearward rotation of the head assembly is restrained by the action of the rearward rotation recess end face against the rearward rotation detent ramp and forward rotation is restrained by the head assembly to base detent system; and in the park position forward rotation of the head assembly is restrained by the action of the forward rotation recess end face against the forward rotation detent ramp and rearward rotation is restrained by the head assembly to base detent system.

The head assembly to base detent system comprises: (1) a drive position forward rotation detent face; (2) a park position rearward rotation stop, the rearward rotation stop and the forward rotation detent face both dependent from either one of the head assembly or the base; (3) a primary outer detent member having a front face engagable with the drive position forward rotation detent face; and (4) a rear face of either the primary outer detent member or a secondary outer detent member, the rear face engagable with the park position rearward rotation stop in the park position, the outer detent member dependent from the other of the head assembly or the base, wherein the mirror head is manually moveable and motor moveable between: (a) the drive position in which forward rotation is restrained by the action of the front face against the forward rotation detent face; and (b) the park position in which rearward rotation is restrained by the action of the rear face against the park position rearward rotation stop.

The head to base detent system described above is applicable to a mirror head.

In an alternative embodiment of the first aspect of the invention, the mirror head assembly is also rotatably mounted to the base for forward rotational movement from the drive position to a front position, and the head assembly to base detent system comprises: (1) a drive position forward rotation detent face; (2) a park position rearward rotation stop; (3) a front position forward rotation stop, the forward rotation detent face, the rearward rotation stop and the forward rotation stop all dependent from either one of the head assembly or the base; (4) a primary outer detent member having a front face engagable with the drive position forward rotation detent face; and (5) a rear face of either the primary outer detent member or a secondary outer detent member, the rear face engagable with the park position rearward rotation stop in the park position, the outer detent member(s) dependent from the other of the head assembly or the base, wherein the mirror head is manually moveable and motor moveable between: (a) the drive position in which forward rotation is restrained by the action of the front face against the forward rotation detent face; and (b) the park position in which rearward rotation is restrained by the action of the rear face against the park position rearward rotation stop.

The planetary gear can comprise of a worm gear.

The assembly can comprise four drive train detent recess and projection pairs, the detent pairs evenly angularly spaced around the first axis.

According to a second aspect of the invention there is provided a power-folding vehicle mirror assembly comprising: (1) a base mountable to a vehicle; (2) a mirror head assembly rotatably mounted to the base for forward rotational movement from a drive position to a front position and for rearward rotational movement from the drive position to a park position; (3) a first clutch body mounted to and rotationally fixed with respect to the base; (4) a second clutch body mounted to the head, the second clutch body biased towards engagement with the first clutch body by a spring; (5) a sun gear mounted to the base for rotation about a first axis and mounted to or integral with the second clutch body for rotation therewith; (6) a planetary gear mounted to the mirror head assembly for rotation about a second axis, the planetary gear meshing with the sun gear; (7) a motor operably connected to the planetary gear thereby providing a gear train for driving the mirror head assembly around the sun gear, the gear train being non-back-driveable; (8) at least four drive train detent recess and projection pairs, the projections extending from the first clutch body and the recesses extending from the second clutch body, each projection comprising a back-to-back ramp pair, one of the ramps of the pair providing a rearward rotation detent and the other of the ramps of the pair providing a forward rotation detent, each recess bounded by a rearward rotation recess end face and a forward rotation recess end face, the detent pairs evenly angularly spaced around the first axis.

Optionally, each recess may be oversized relative to the corresponding projection such that rotational slip can occur with changes in rotational direction of the first clutch body with respect to the second clutch body.

The assembly can comprise a head assembly to base detent system operably interposed between the head assembly and the base, wherein the mirror head is manually moveable and motor moveable between: (a) a drive position in which rearward rotation is restrained by the action of the rearward rotation recess end faces against the rearward rotation detent ramps and forward rotation is restrained by the head assembly to base detent system; and (b) a park position in which forward rotation is restrained by the action of the forward rotation recess end faces against the forward rotation detent ramps and rearward rotation is restrained by the head assembly to base detent system.

The head assembly to base detent system can comprise: (1) a drive position forward rotation detent face; (2) a park position rearward rotation stop, the rearward rotation stop and the forward rotation detent face both dependent from either one of the head assembly or the base; (3) a primary outer detent member having a front face engagable with the drive position forward rotation detent face; and (4) a rear face of either the primary outer detent member or a secondary outer detent member, the rear face engagable with the park position rearward rotation stop in the park position, the outer detent member(s) dependent from the other of the head assembly or the base, wherein the mirror head is manually moveable and motor moveable between: (a) the drive position in which forward rotation is restrained by the action of the front face against the forward rotation detent face; and (b) the park position in which rearward rotation is restrained by the action of the rear face against the park position rearward rotation stop.

In an alternative embodiment of the second aspect of the invention, the mirror head assembly is also rotatably mounted to the base for forward rotational movement from the drive position to a front position, and the head assembly to base detent system comprises: (1) a drive position forward rotation detent face; (2) a park position rearward rotation stop; (3) a front position forward rotation stop, the forward rotation detent face, the rearward rotation stop and the forward rotation stop all dependent from either one of the head assembly or the base; (4) a primary outer detent member having a front face engagable with the drive position forward rotation detent face; and (5) a rear face of either the primary outer detent member or a secondary outer detent member, the rear face engagable with the park position rearward rotation stop in the park position, the outer detent member(s) dependent from the other of the head assembly or the base, wherein the mirror head is manually moveable and motor moveable between: (a) the drive position in which forward rotation is restrained by the action of the front face against the forward rotation detent face; and (b) the park position in which rearward rotation is restrained by the action of the rear face against the park position rearward rotation stop.

The planetary gear can comprise a worm gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

Figure 1:
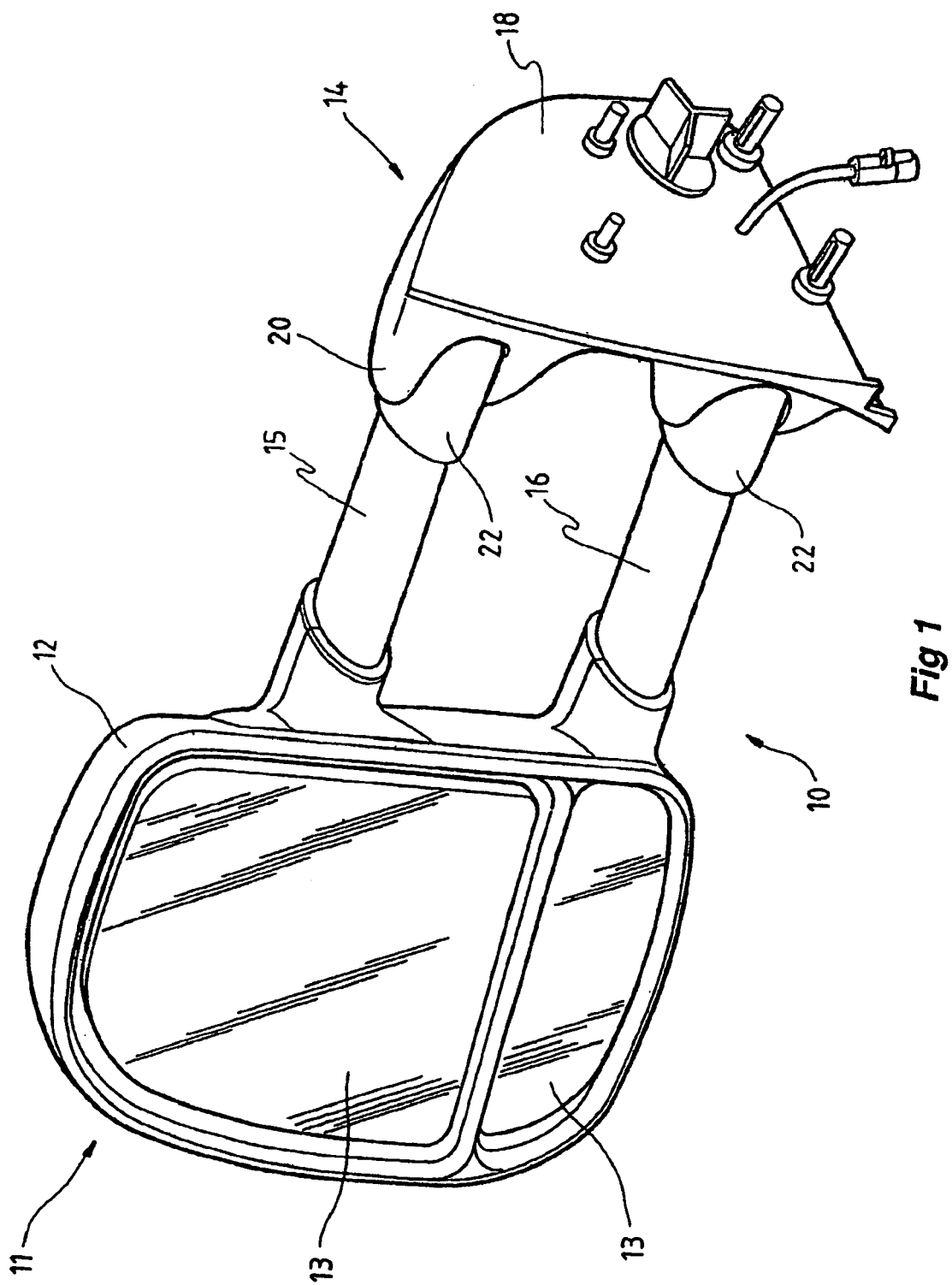
FIG. 1 shows a perspective view of a two arm rear vision mirror incorporating a power fold mechanism according to the present invention.

Now looking generally at the drawings and in particular FIG. 1 it will be seen that the external rear vision mirror for a larger motor vehicle or truck 10 includes a mirror head assembly 11 which comprises a head portion 12 and two mirrors 13. The mirrors 13 may be separately adjusted so that different portions of the road can be viewed. The mirror assembly 10 has a base assembly 14 with upper and lower mirror arms 15 and 16 respectively extending from the base assembly to the mirror head 12.

The mirror head 12 and attached arms 15 and 16 form a mirror head assembly 11 that is rotatable with respect to the base assembly 14.

The base assembly 14 comprises a mirror base 18 and a base housing 20. Shrouds 22 are provided on the upper and lower arms to shroud the power fold motor assemblies as will be discussed later.

Figure 2:
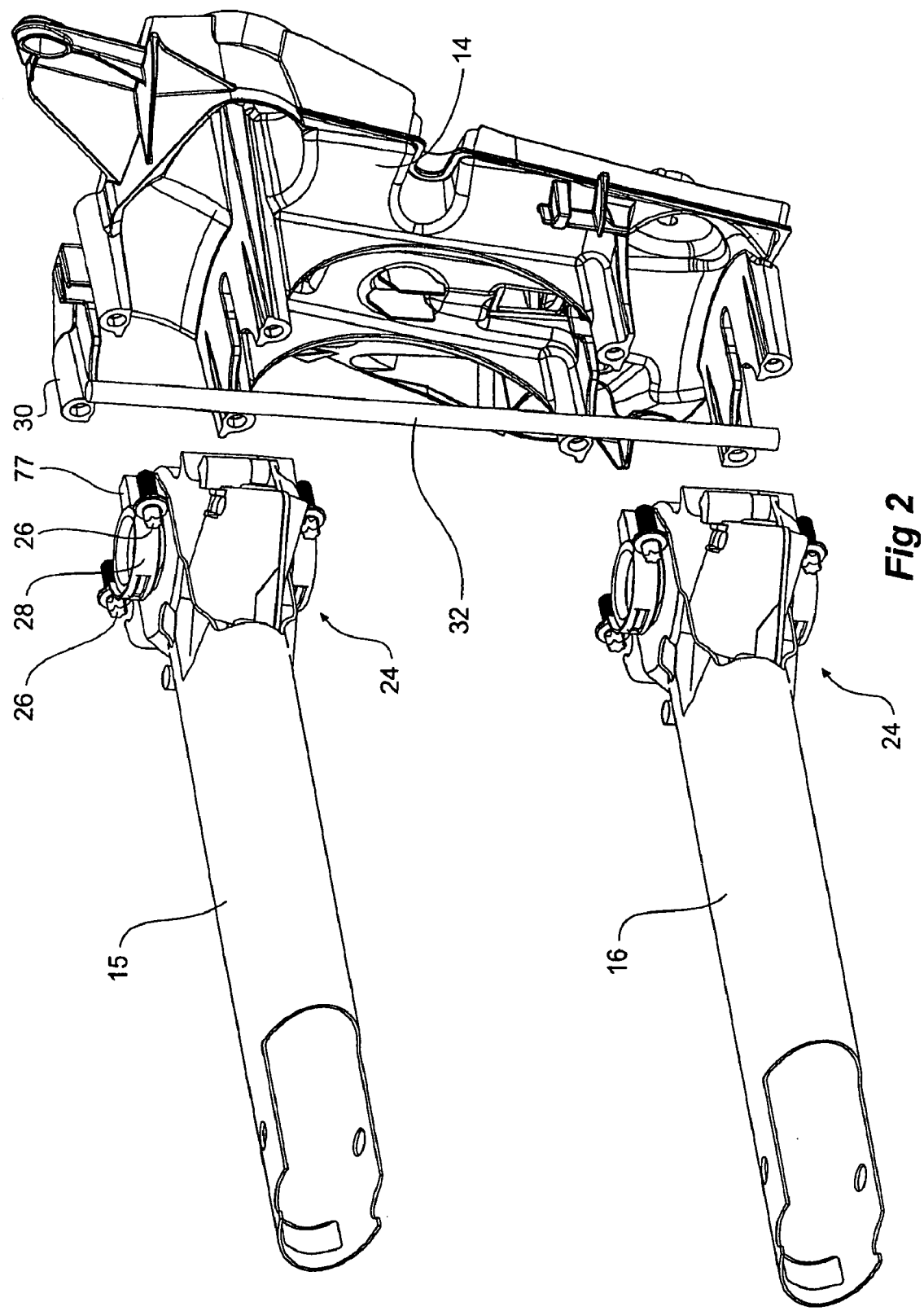
FIG. 2 shows a partially exploded view of the mirror base and arms according to the embodiment shown in FIG. 1.
Figure 3:
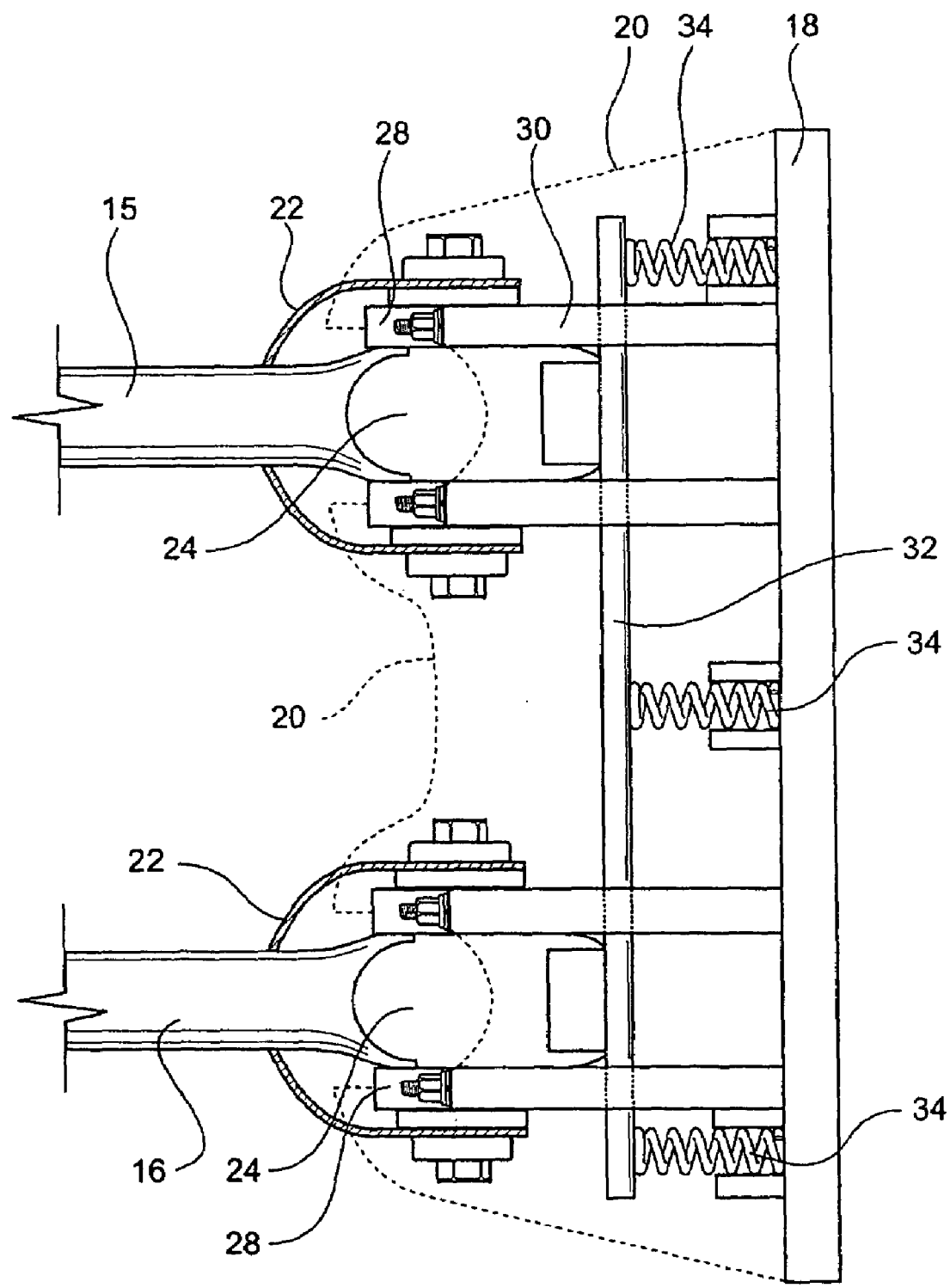
FIG. 3 shows a side cross-sectional view of the base and part of the arms.
Figure 4:
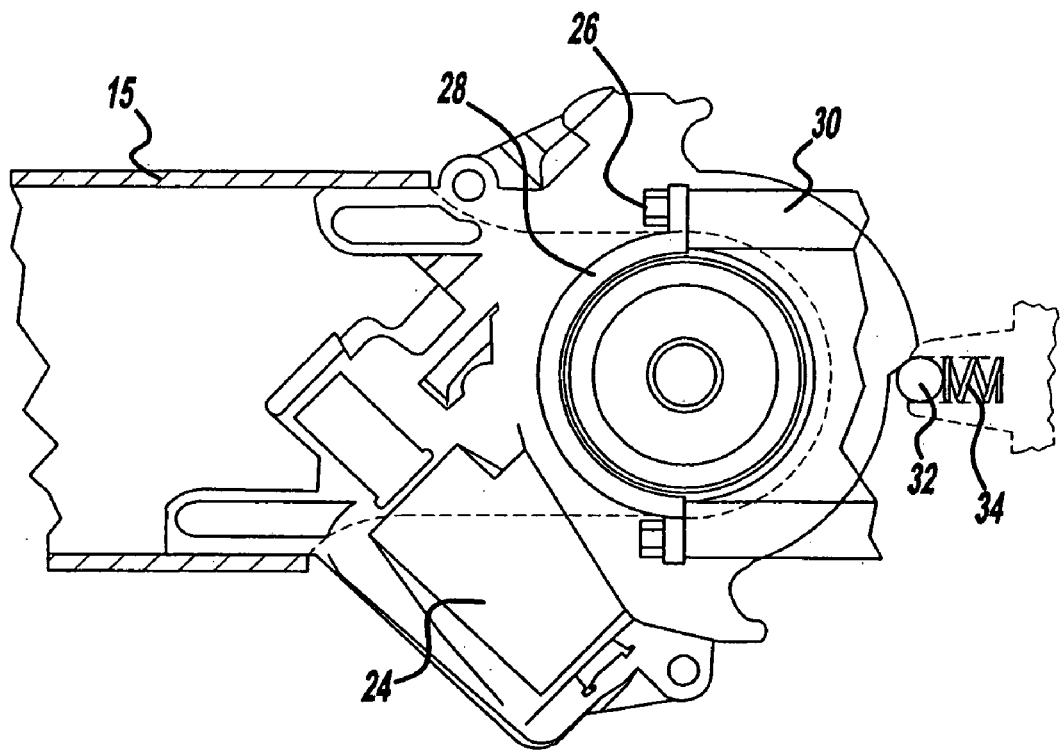
FIG. 4 shows a top view of one of the motor assemblies mounted in an arm.

FIGS. 2, 3 and 4 show the base in some detail. In FIG. 2, the base housing 20 and the arm shrouds 22 have been removed to show clarity and the base and arms are separated or exploded to more clearly show the arrangement.

Each arm 15 and 16 has a motor assembly 24 mounted into it. The motor assemblies 24 are mounted into the base by means of bolts 26 holding U-shaped attachment straps 28 against projections 30 in the base 14. Also received in the base is a detent bar 32 which is urged outward by means of springs 34 at the top of the base at the centre of the base and at the bottom of the base. The detent bar 32 provides a stop when the arms are rotated as will be discussed later. The detent bar also provides a load to prevent forward breakaway.

Figure 6:
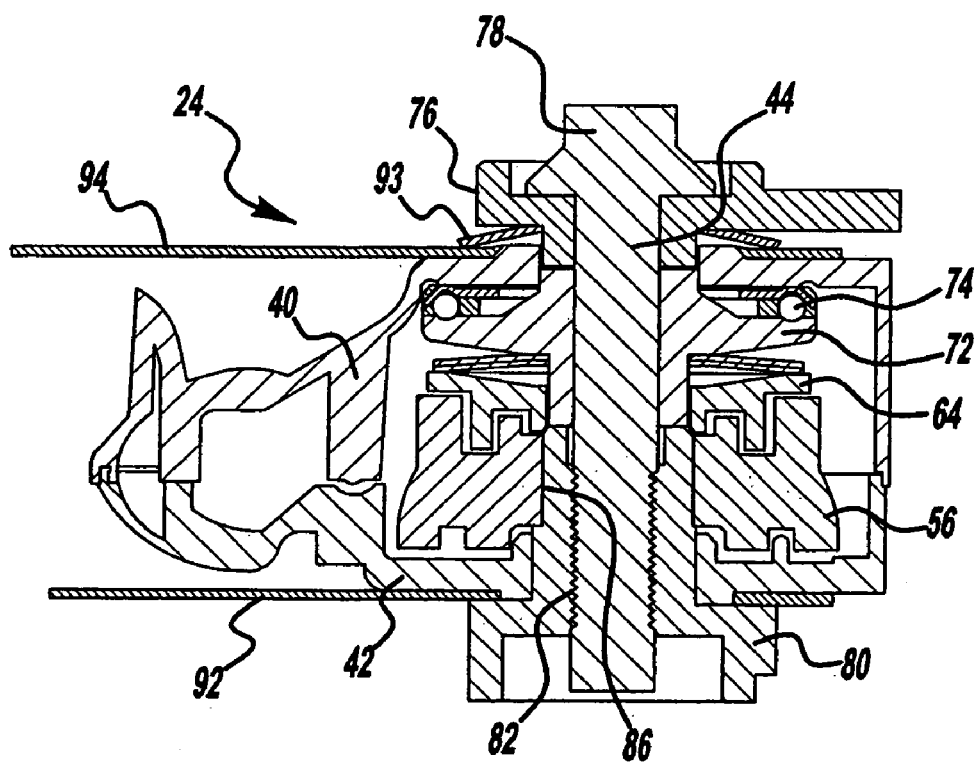
FIG. 6 shows a side cross-sectional view of the assembled motor assembly.
Figure 5:
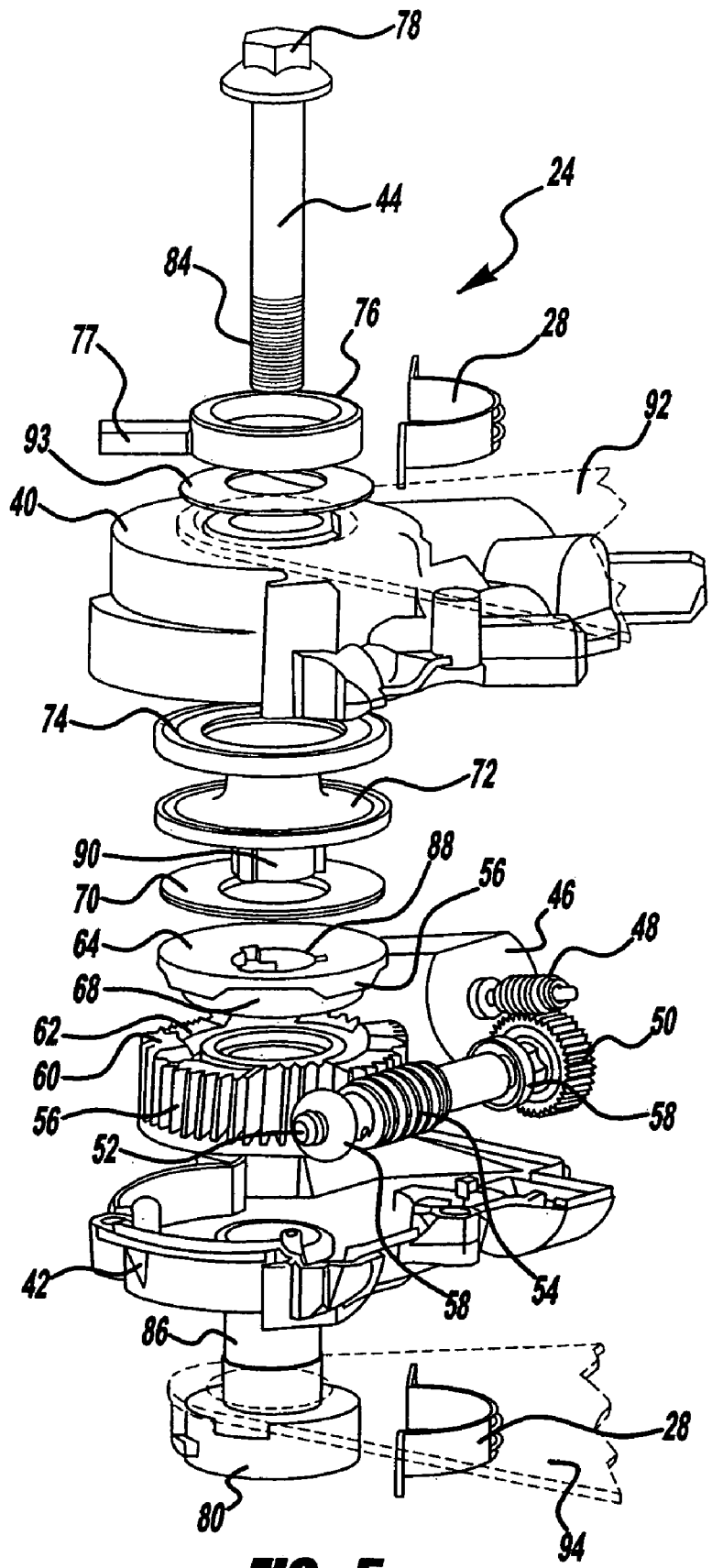
FIG. 5 shows an exploded view of the motor assembly showing the various components.

The motor assembly 24 is shown in breakaway view in FIG. 5 and in an assembled side cross-sectional view in FIG. 6. The motor assembly has an upper housing portion 40 and a lower housing portion 42 with a through bolt 44 holding the portions together and providing the central axis of rotation of the housing and hence the mirror arm to which it is attached.

Within the motor housing 24 is a motor 46 which when operated drives a motor worm 48 on which is a motor worm gear 50 which acts on drive shaft 52 and drives a drive worm 54. The drive worm drives a drive gear 56. The drive shaft 52 has bearing races 58 at each end thereof with the bearing races taking both axial and tangential loads caused by the drive gear 56 reacting to the drive worm 54.

The drive gear 56 has four detents 60 on its upper surface and four drive gear recesses 62 between the drive gear detents. A clutch 64 which engages against the drive gear 56 has four detents 66 and four clutch recesses 68 between the clutch detent 66. When the clutch is engaged the clutch detent 66 engages in the drive gear recesses 62 and the drive detents 60 engage in the clutch recesses 68.

The clutch 64 is held into engagement with the drive gear 56 by means of clutch spring 70. The spring 70 bears against reaction member 72. The motor housing assembly 40 and 42 is separated from the reaction member 72 by means of bearing race 74 and the reaction member 72 engages directly against upper support member 76 into which the head 78 of the bolt 44 engages. The upper support member 76 has a support arm 77 and the U-shaped attachment strap 28 engages around the upper support member 76.

A lower support member 80 has a threaded longitudinal aperture 82 into which threads 84 on bolt 44 are engaged. The lower support 80 also provides a cylindrical bearing surface 86 upon which the drive gear 56 runs.

The actual axle about which the motor housing rotates is therefore provided by the lower support 80, the upper support 76 and the reaction member 72 all of which are held together by the through bolt 44. The upper support 76 and the reaction member 72 have inter-engaging lugs to prevent relative rotation.

The clutch is able to move longitudinally within the motor housing because it has a splined aperture 88 which can move up and down on splined shaft 90 on the reaction member 72. The mirror arm 15 as can be seen in FIG. 7A includes upper and lower flanges 92 and 94 which are engaged underneath the upper and lower supports 76 and 80 to be fixed in relation to the motor housings 40 and 42 respectively but to allow the supports to be fixed with respect to the mirror base.

The upper support 76 holds stability disc spring 93 tight against the upper arm flange 94 wedging it against a conical boss on the upper portion 40 of the motor housing to provide an anti slop joint between the arm and housing. The disc spring 93 also provides the reaction force to clamp the housing to the reaction member 72 through bearing race 72 thereby providing a low friction pivoting joint for the mechanism. This again makes the joint able to be driven by a small motor and reduces vibration induced image displacement in the mirror glass in the mirror by elimination of slop.

This then describes the constructional features of the power fold mirror according to this invention and the operation of the power fold system and manual folding arrangement will now be discussed in relation to FIGS. 7A to 7L.

Figure 7A:
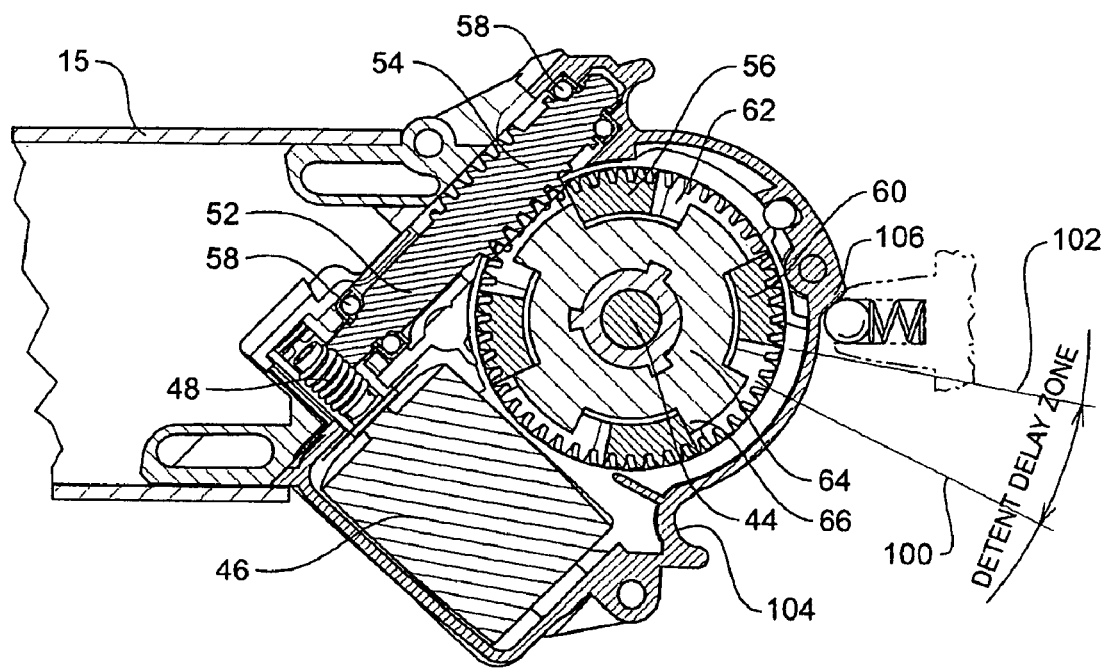
FIGS. 7A to 7L show a cut-away view of the motor assembly and part of the arm at the various stages of power fold and manual movement and return.
Figure 7B:
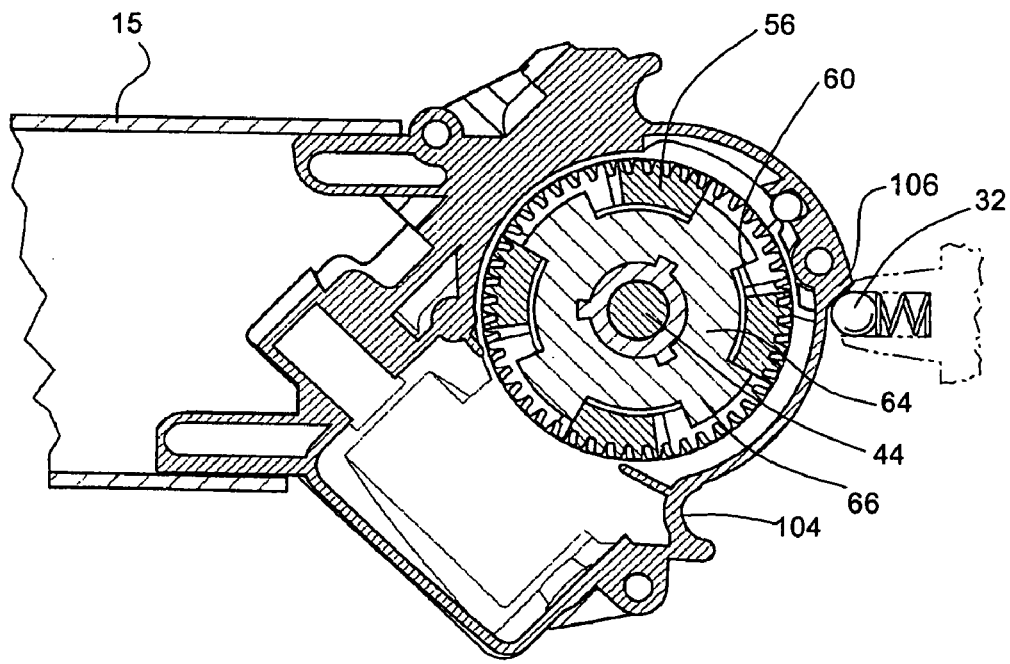
Figure 7C:
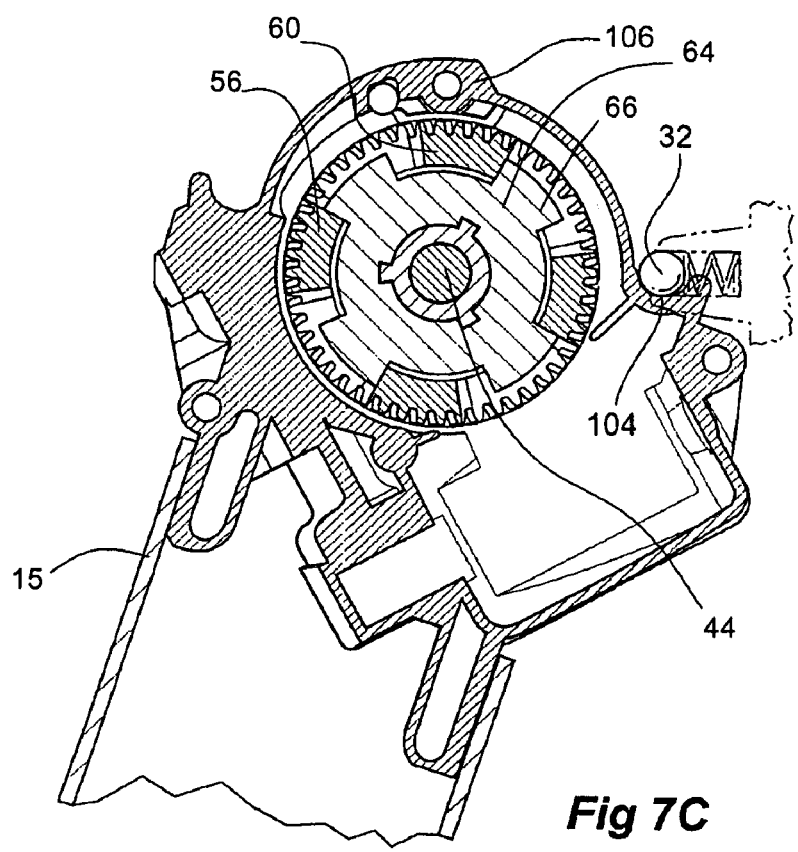

Generally FIGS. 7A to 7C show the various stages between the rest period when the mirror is deployed in the driving position to FIG. 7C where the mirror is in the foldaway or park position. The power movement from the fold away position shown in FIG. 7C to the deployed position in FIG. 7A is shown in the reverse order.

FIGS. 7C to 7F show the sequence of operations with a manual return from the park or foldaway position to the deployed driving position.

Figure 7D:
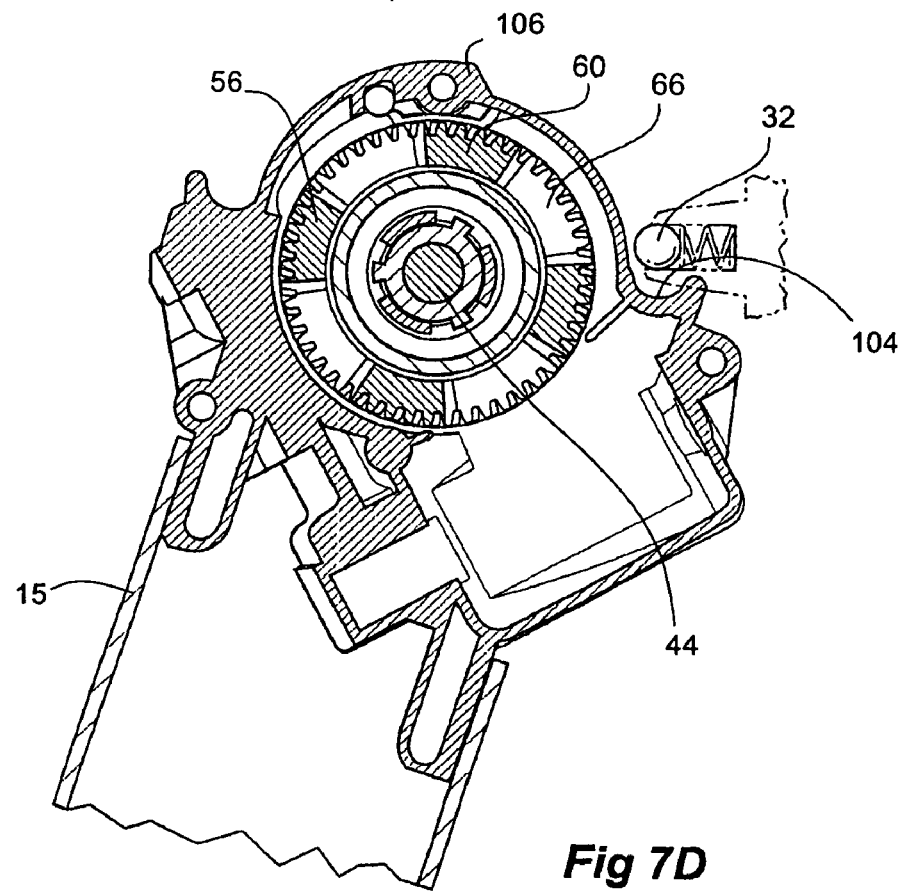
Figure 7E:
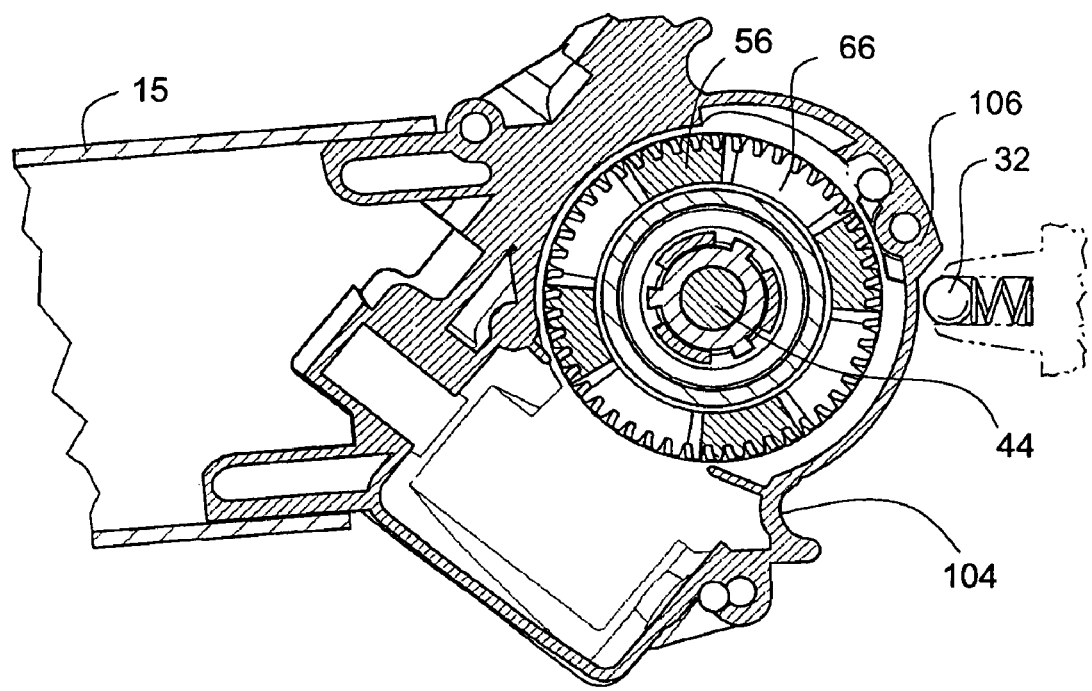
Figure 7F:
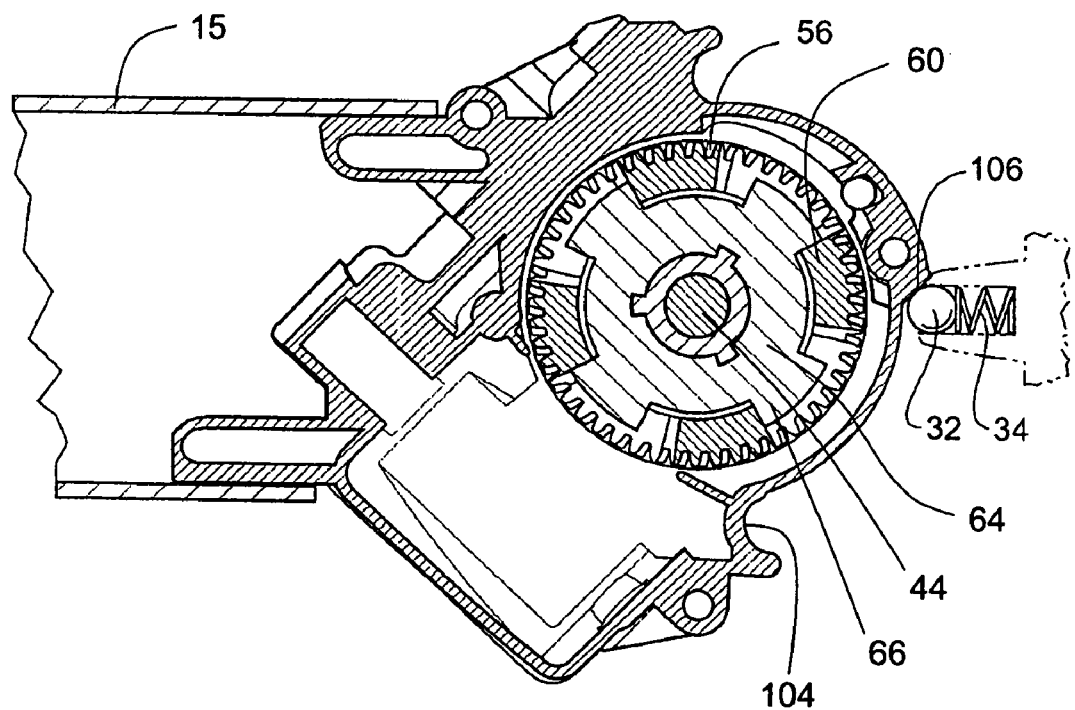
Figure 7G:
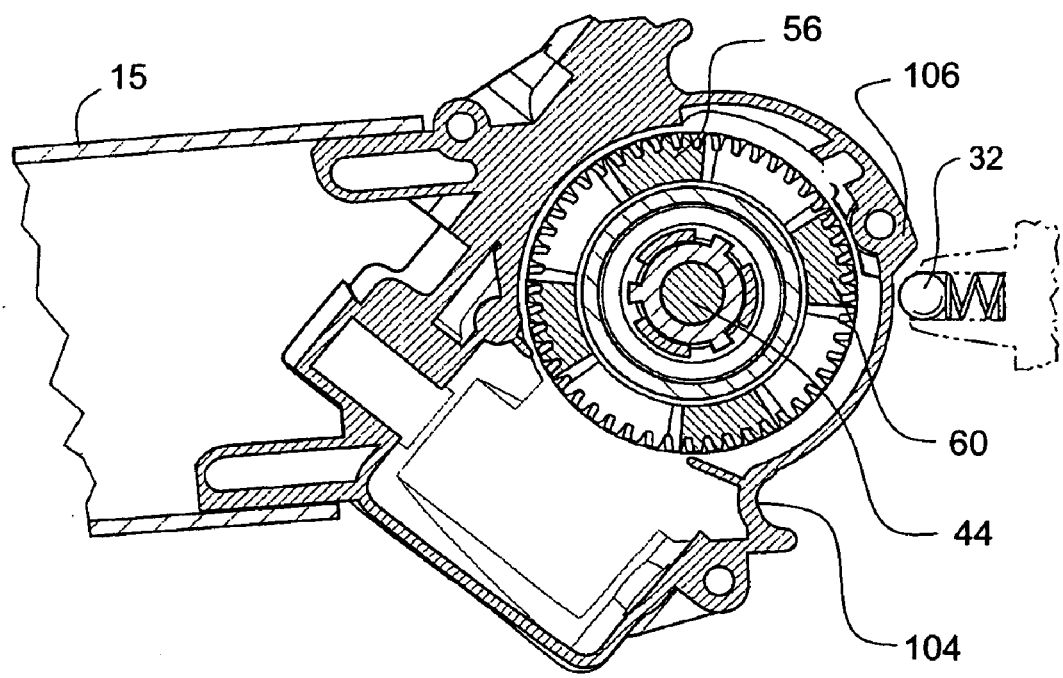
Figure 7H:
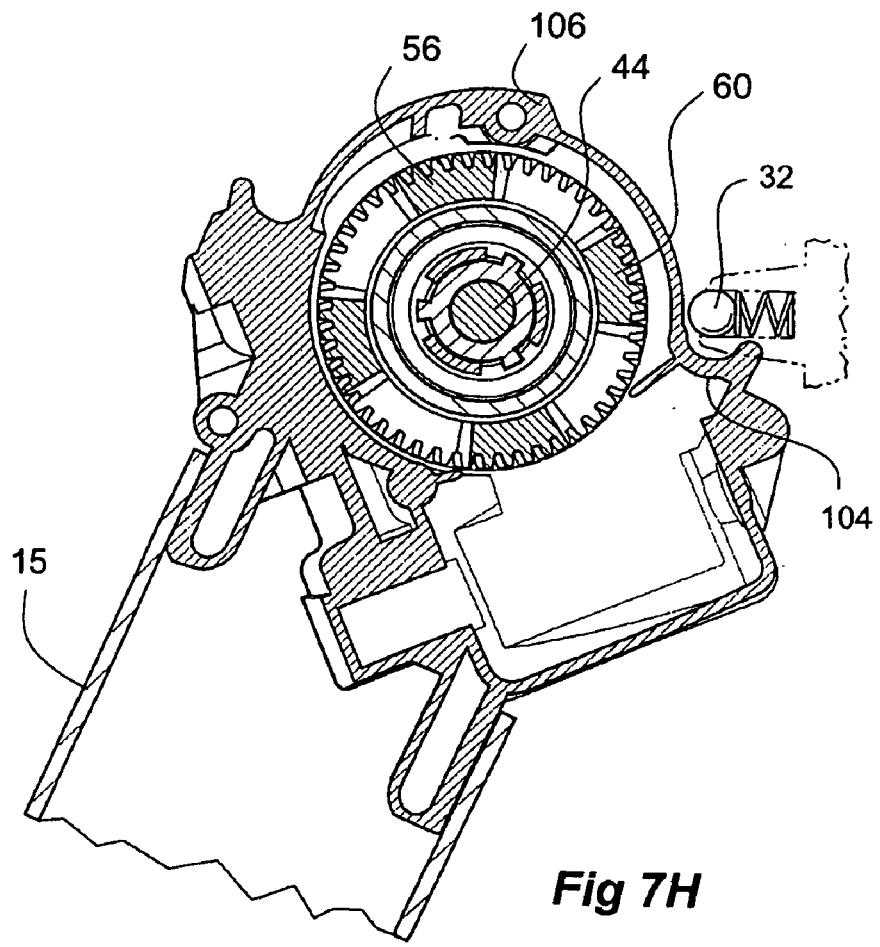
Figure 7I:
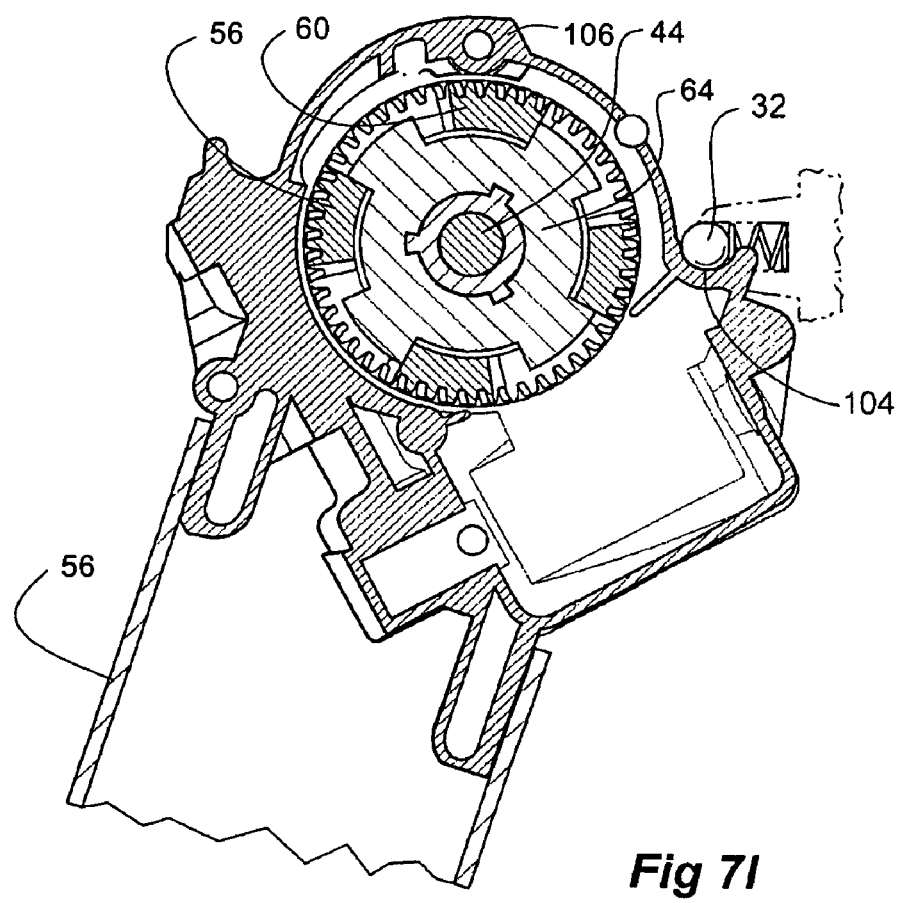

FIGS. 7G to 7I show the sequence of operations with a manual fold into the park position.

Figure 7J:
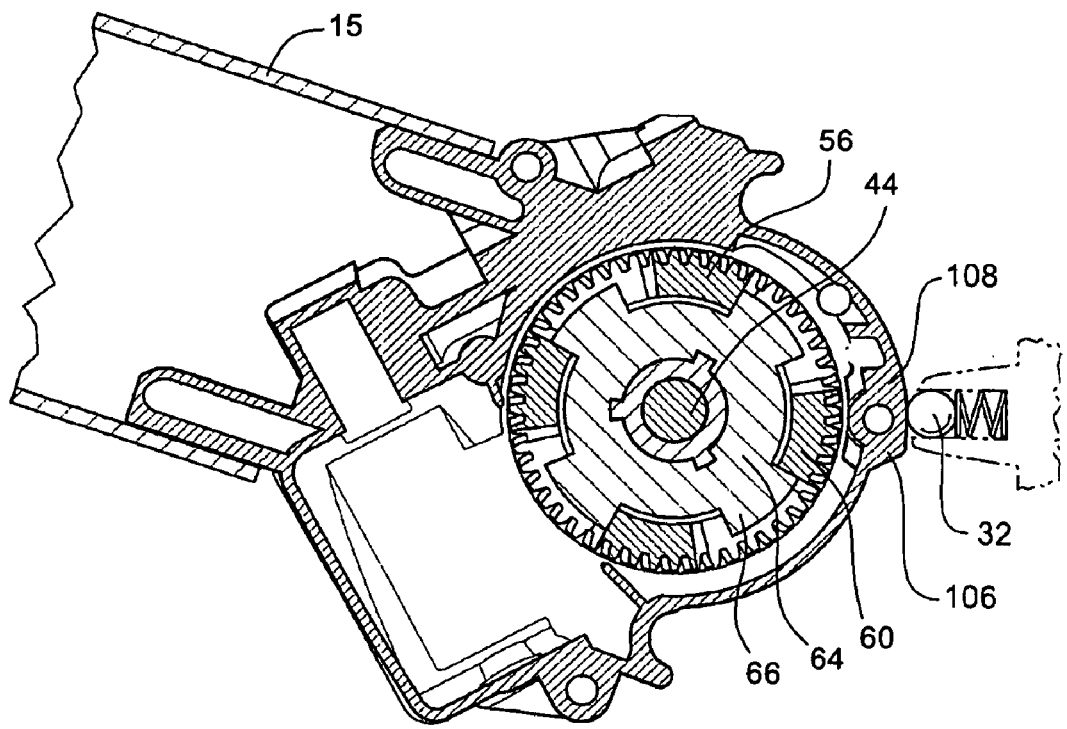
Figure 7K:
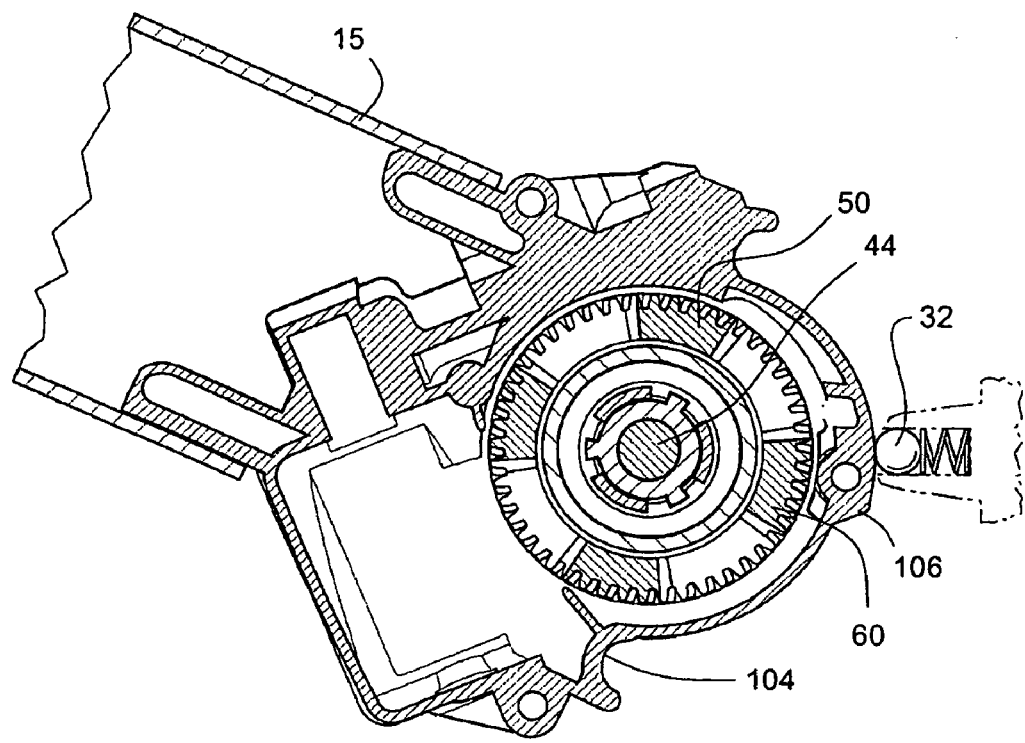
Figure 7L:
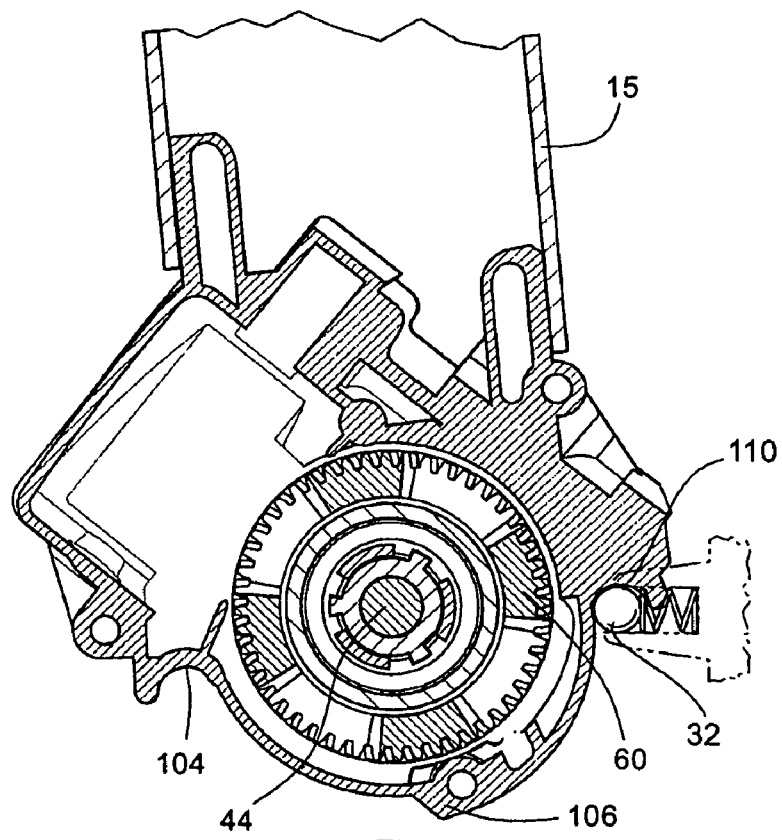

FIGS. 7J to 7L show the sequence of operations in a manual movement from the drive position to forward breakaway position.

FIGS. 7L through 7J, 7C to FIG. 7A show the sequence of steps necessary for a power fold recovery from the forward breakaway position to the deployed or driving position.

In FIG. 7A the detent delay zone is shown as the angle between lines 100 to 102. When the motor 46 is activated to move the mirror to the foldaway position the drive gear 56 is driven in a clockwise direction so that the first action is that the detent delay zone is taken up to the position shown in FIG. 7B. In this stage the worm drive 54 has forced the drive gear 56 to rotate through the delay zone until it is held stationary in effect to the mirror base via the clutch. This is because the drive gear detent faces are in contact with the clutch detent faces and the clutch is held stationary to the mirror base via the splines between the clutch and the reaction member 72.

Further rotation of the worm gear 54 causes the motor housing and arm 15 to move anticlockwise around the bolt shaft 44 until the detent bar engages with the park position stop 104 on the outside of the motor housing. As the mirror head approaches the park position the external detent bar attached to the mirror base comes in close contact to the mirror head park position travel stop 104 and stalls the mechanism. Any backlash in the mechanism taken out by the action of the worm driven gear chain wedging the mirror head up to the mirror base between the end thrust of the worm drive and the pivot centre and the external detent bars. This stabilises the mirror head to the mirror base by restricting any movement caused by running clearances in the folding system.

In the reverse operation from the park position to the driving position the action is shown from FIGS. 7C to 7A. The electric motor 46 driving the double worm gear arrangement rotates the mirror assembly 11 and hence the mirror head 12 around the drive gear 56 towards to the deployed driving position. The force to rotate the mirror head is applied through the end thrust of the worm drive 52 via the ball bearings and races 58. The worm drive 52 has forced the drive gear 56 to rotate through the delay zone until it is held stationary to the mirror base or in fact the clutch. The stationary condition is produced via the drive gear detent faces that are in contact with the clutch detent faces as the clutch is fixed with relation to the mirror base.

As the mirror head approaches the deployed driving position the external detent bar 32 attached to the mirror base comes into contact with the stop 106 on the outside of the motor housing which stalls the electric motor. Any backlash in the electric motor or mechanism taken up by the action of the motor driven gear chain wedging the mirror head up to the mirror base between the end thrust of the worm drive 52 and the external detent bar 32. As load increases the current sensing circuit detects the current increase and shuts off the motor 46. This stabilises the mirror head to the mirror base by restricting any movement caused by running clearances in the folding system which could contribute vibration induced image displacement on the mirror.

If the mirror is in the parked or foldaway position, as shown in FIG. 7C, then it can be manually returned to the deployed driving position shown in FIG. 7A and FIG. 7F.

External force applied to the mirror head is transferred to the drive gear 56 via the non-back driving worm drive forcing the drive gear to turn against the clutch which is fixed to the mirror base via the splines on the clutch. The gear drive detents 60 cause the clutch detent 66 to lift against the load of the spring 70. It will be noted therefore that in effect the mirror head is retained in a detent in the parking or foldaway position. Further rotation of the mirror head, as shown in FIG. 7D, forces the faces of the clutch detents 66 to begin to contact with the drive gear detent faces 60. The detents move over each other until the detent on the clutch drop in to the next available detent on the drive gear. At this stage, as shown in FIG. 7E, the disc spring 70 forces the clutch detents 66 to engage with the drive gear detents 60 and the central stop 106 engages against the external detent bar 32. This again gives a stable connection between the mirror head and base for travel.

If it is desired to manually fold the mirror in then the series of steps shown from FIGS. 7F to 7I are necessary.

External force is applied to the mirror head in a counter-clockwise direction and the force is transferred to the drive gear 56 via the non-back driving worm drive 52 forcing the drive gear 56 to turn against the clutch 64, as discussed above, is fixed to the base of the mirror via the splines. The respective detents cause the clutch to lift compressing the disc spring 70. Further rotation causes the faces on the clutch detents to begin to contact with faces on the drive gear detents as shown in the transition from FIGS. 7G to 7H. Further rotation as shown between FIGS. 7H and 7I causes the respective detents to re-engage and forces the stop 104 to engage with the external detent bar 32. This gives a stable detented park position between the mirror head and mirror base.

A manual forward fold is shown from the deployed position as shown in FIG. 7A to FIGS. 7J to 7L. External load in the forward direction causes the external detent bar 32 which is engaged against the central stop as shown in FIG. 7F to compress the springs 34 so that the detent bar 32 can move past the central stop 106 and then the external detent bar 32 runs along the deploy position ramp 108 as shown in FIG. 7K. As this is occurring, the non-back driving worm drive 52 forces the drive gear to rotate through the detent delay zone. It should be noted that the detenting action of the central stop 104 is completely overcome before the drive gear detent face contacts the clutch detent face. This ensures the forward folding load does not become excessive and is similar to the rearward folding load.

Continued external force towards to the forward breakaway position continues to force the drive gear to turn against the clutch such that the drive gear detents cause the clutch detents to lift compressing the disc spring 70. This movement of the detents against the spring produces a secondary load during the initial part of the forward folding.

Further forward folding causes the mirror head stop 110 to engage the detent bar 32, as shown in FIG. 7L.

The final action is to electrically recover from the manual forward fold position.

This is done as a series of steps from the position shown in FIG. 7L to the position shown in FIG. 7A to the position shown in FIG. 7C and then back to the position shown in FIG. 7A again. From the position as shown in FIG. 7L, the motor 44 acts through the double worm drive to drive gear 56. As the drive gear 56 is engaged with the clutch 64, the drive gear stays stationary and the motor housing moves anticlockwise so that the detent bar 32 moves towards and engages the ramp 108. As the ramp angle is very shallow, insufficient load is provided to the motor to cause it to cut out or stall and the detent bar 32 passes over the central stop 106 until it is in the position as shown in FIG. 7A. At this stage, however, there is no load to stop the mirror head movement and the mirror head continues movement until the stop 104 engages the detent bar 32. At this stage, the motor is caused to stop by overload sensing. A vehicle internal switch can then be activated to restart the motor in the opposite direction and the motor then moves the mirror head back to the driving position, as discussed above, for the power deploy action.

With the embodiment of the invention described above, with references to FIGS. 1 to 7, a detent bar 32 is mounted to the base 14 (e.g., most clearly shown in FIGS. 3 and 4). The action of the detent bar 32 against stops on the outside of the motor housing 106 provides a head assembly to base detent system as is illustrated in FIGS. 7A to 7L.

Figure 8A:
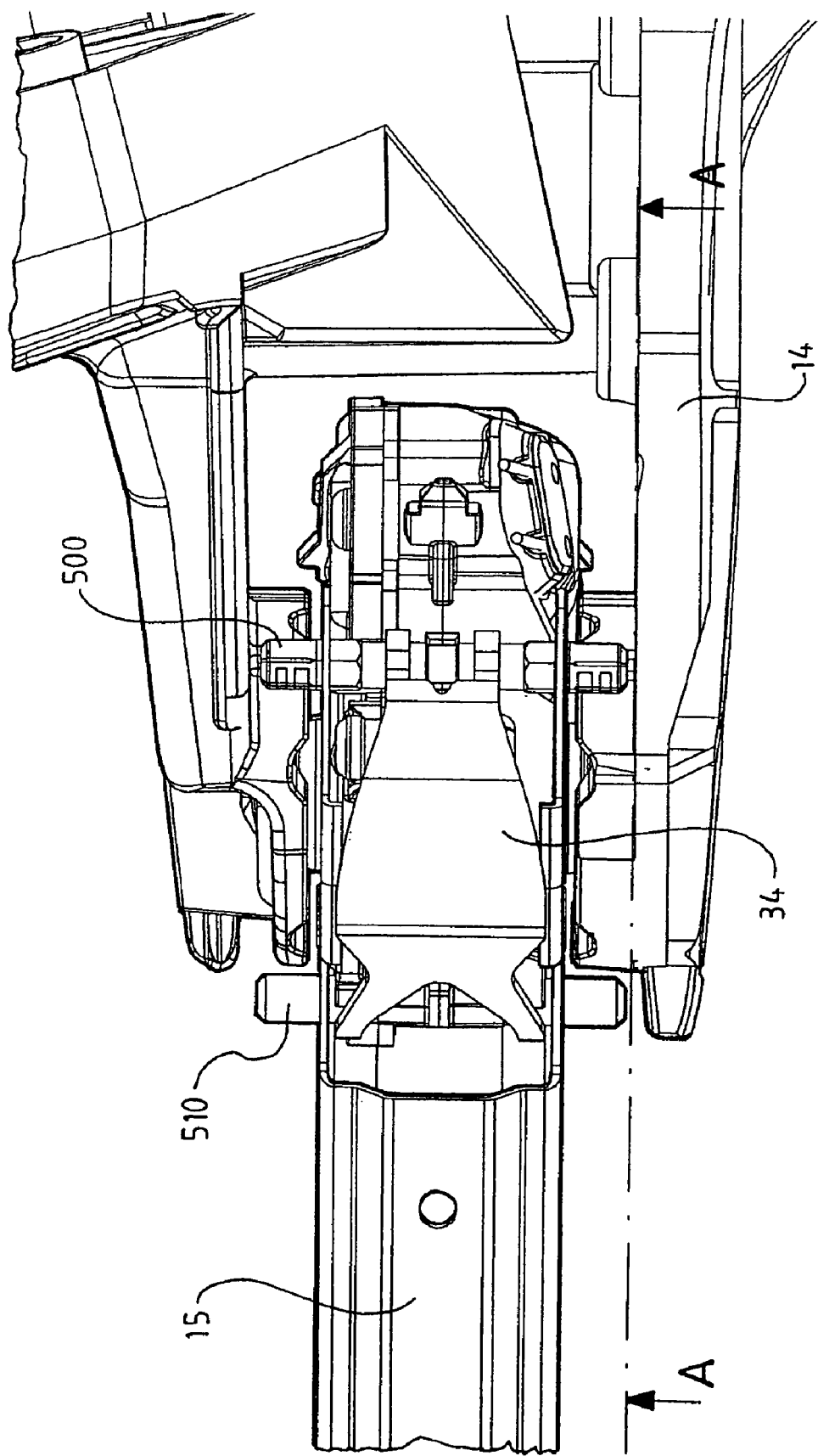
FIGS. 8A and 8B show an alternative embodiment of a vehicle mirror assembly.
Figure 8B:
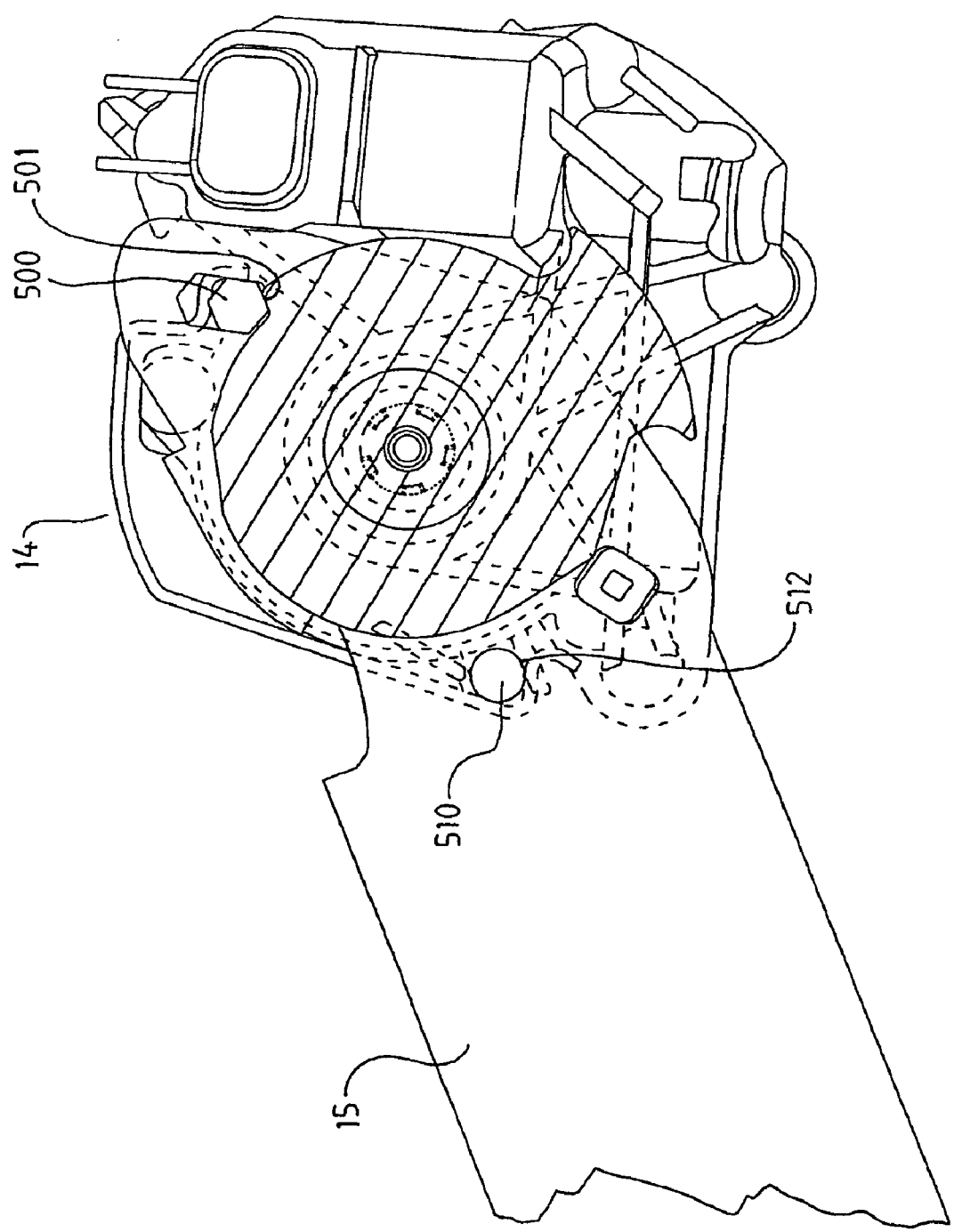

In an alternative embodiment of the invention, illustrated in FIGS. 8A and 8B, a detent bar or drive pin 500 is mounted to the head assembly 11. The drive pin 500 is selectively engagable with the drive position forward rotation detent face 313, and the front position forward rotation stop 314. A spring 34 (e.g., as shown in FIG. 8A) biases the pin 500 inwards. A second drive pin 510 is provided for engagement with the rearward rotation stop 312.

With either embodiments of the invention (described with reference to FIG. 4 or FIG. 8B), a drive train detent assembly is also provided. Within the drive train detent assembly, oversized detent recesses can be provided such that rotational slip can occur with changes in rotational direction of the mirror head assembly with respect to the base. This is illustrated schematically in FIGS. 9A to 16D. The use of oversized detent recesses provides significant improvement in that it is simple to change the park to deploy angle by changing the angular size of the oversize detent recess or recesses, as is explained below.

Figure 9A:
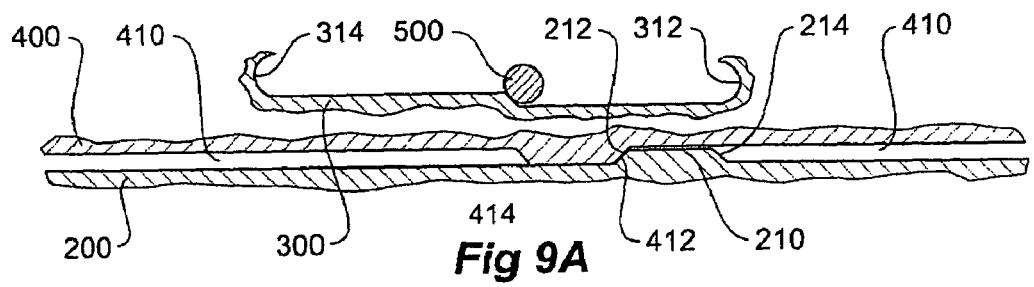
FIGS. 9A to 9F show schematically progressive electric fold in of the assembly shown in FIGS. 8A and 8B utilising a single set of drive train detent recess and projection pairs, from a drive position (deploy position) to a park position.

FIGS. 9A to 9D show schematic movement of the components of the assembly shown in FIGS. 8A and 8B from a drive position to a park position. For ease of description, a single drive pin 500 is shown. Referring first to FIG. 9A, a first clutch body 200 which is mounted to and rotationally fixed with respect to the base 14 (shown in FIG. 1) is shown positioned adjacent the second clutch body 400 that is mounted to the head assembly 11 (also shown in FIG. 1). The first and second clutch bodies 200 and 400 are biased towards engagement with each other by a spring (e.g., such as spring 70 shown in FIG. 5). A sun gear mounted to the base for rotation about a first axis and mounted to or integral with the second clutch body 400 for rotation therewith is provided. A planetary gear, in the form of a worm gear, is mounted to the mirror head assembly 11 for rotation about a second axis, the worm gear 54 meshing with the sun gear 56 (e.g., in the same way as illustrated in FIG. 5). A motor 46 (also shown in FIG. 5) is operably connected to the worm gear 54. Because the planetary gear 54 is a worm gear, the gear train is non-back-drivable. That is, while the motor 46 can drive the planetary gear 54 around the sun gear 56, the sun gear 56 cannot cause the planetary gear 54 to rotate. In this embodiment of the invention, planetary gear 54 is a worm gear which is inherently non-back-drivable. In other embodiments of the invention, non-back-drivability may be provided by other means.

In this embodiment of the invention, the sun gear 56 is a spur gear or a helically cut gear. It is referred to as a sun gear simply because it is a gear about which another gear, e.g., the planetary gear 54, can rotate. Similarly, the planetary gear/worm gear 54 is only referred to as a planetary gear because it rotates around the sun gear 56 in the fashion of a planet surrounding a sun.

Returning now to FIG. 9A, it can be seen that a drive train detent recess and projection pair is formed by a projection in the form of a back-to-back ramp pair 210 extending from the first clutch body 200 and a recess 410 within the second clutch body. Referring now to FIG. 9D, it can be seen that the recess 410 is bounded by reward rotation recess end face 412 and forward rotation recess end face 414. The recess 410 is oversized relative to the corresponding projection 210 such that rotational slip can occur with changes in rotational direction of the first clutch body 200 with respect to the second clutch body 400.

Figure 9B:
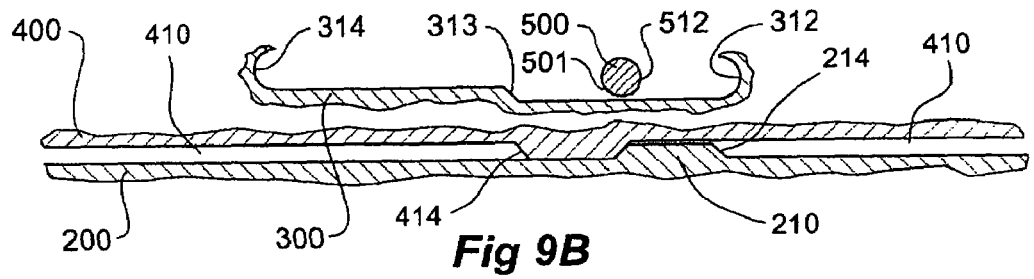

In addition to the above described drive train detent system, a head assembly to base detent system is also provided by drive pin 500 and associated stops 312, 314 and face 313 most clearly shown in FIG. 9B. This head assembly to base detent system is operably interposed between the head assembly 11 and the base 14.

Figure 9C:
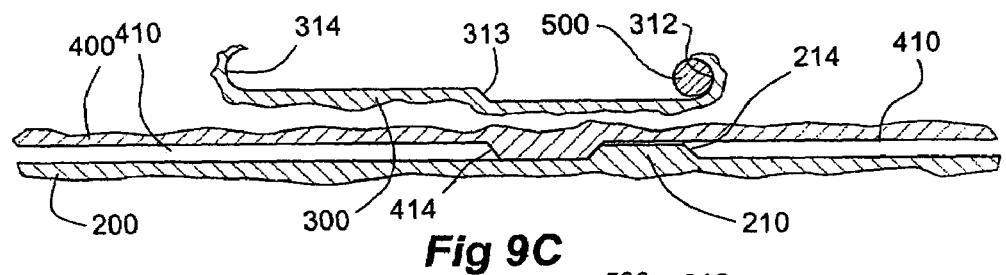
Figure 9D:
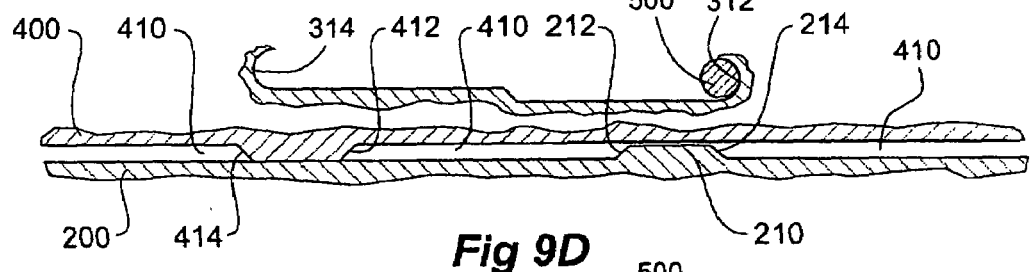
Figure 9E:
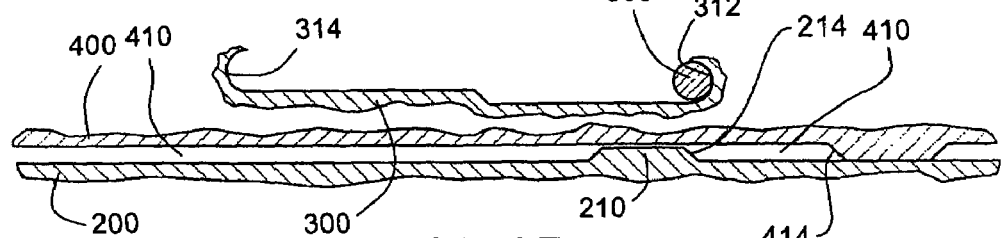
Figure 9F:
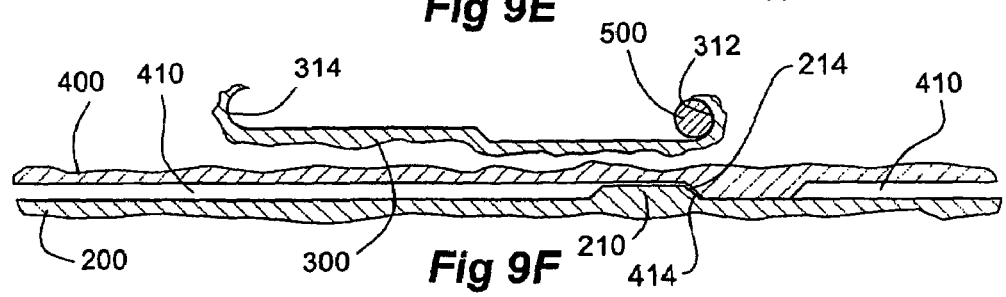
Figure 10A:
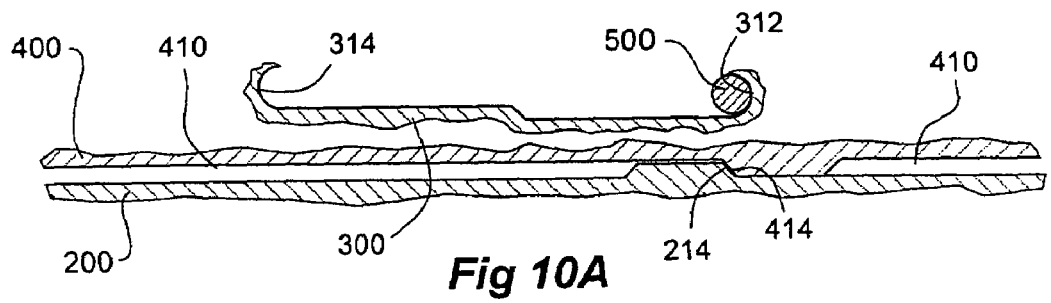
FIGS. 10A to 10F are similar to those of FIGS. 9A to 9F but show progressive electric fold-out from the parked position to the drive position.
Figure 10B:
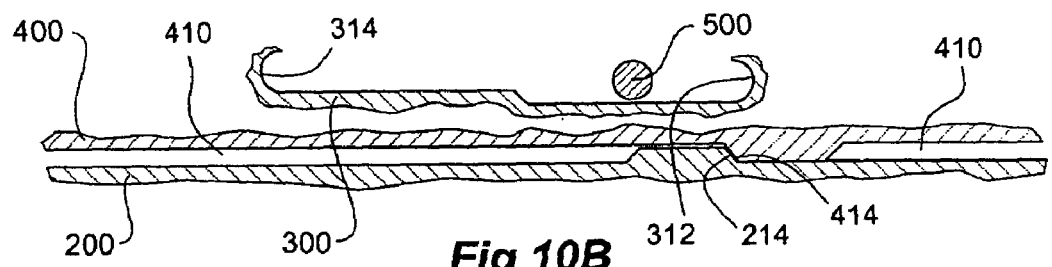
Figure 10C:
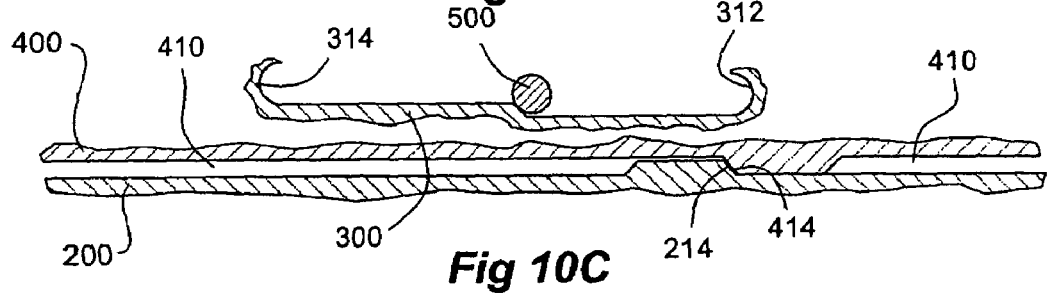
Figure 10D:
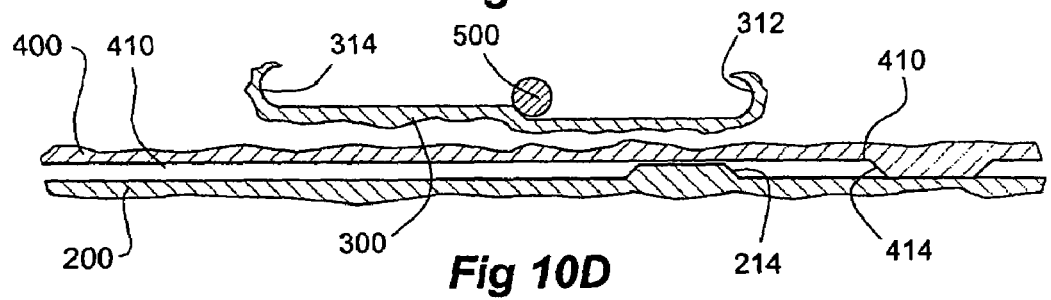
Figure 10E:
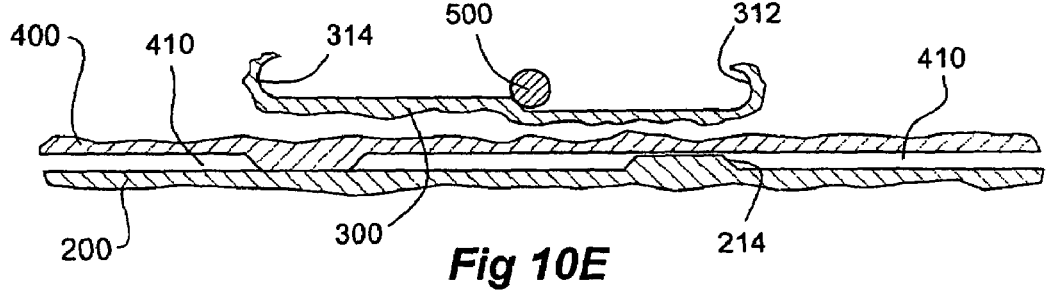
Figure 10F:
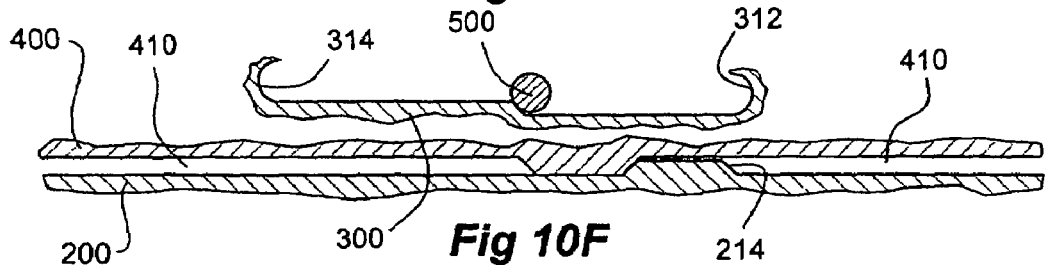

The combination of the drive train detent system and the head assembly to base detent system allows the mirror head to be manually movable and motor moveable between the drive position shown in FIG. 9A to a park position shown in FIG. 9F.

In the drive position shown in FIG. 9A, rearward rotation is restrained by the action of the rearward rotation recess end face 412 against the rearward rotation detent ramp 212 (also shown in FIG. 9D) and forward rotation is restrained by the head assembly to base detent system. More specifically, the front face 501 of the drive pin 500 engages the drive position forward rotation detent base 313 to restrain forward rotation.

Movement of the mirror head assembly 11 from the drive position to the park position is shown progressively from FIGS. 9A to 9C. The electric motor drives the worm gear 54 around the sun gear 56 with the friction between the second clutch body 400 and the first clutch body 200 being sufficient to prevent slippage between the clutch bodies. Once the rear face 512 of the pin 500 reaches the park position rearward rotation stop 312 as is shown in FIG. 9C, slippage between the clutch bodies occurs as the motor continues to drive. Slippage occurs because now the mirror head assembly 11 and hence the worm gear 54 is constrained forcing movement of the sun gear and hence the second clutch body 400 relative to the first clutch body 200 which is rotationally fixed to the base. This slippage is clearly shown progressively from FIGS. 9D to 9F. Once the position shown in FIG. 9F is reached, the forward rotation detent ramp 214 has engaged the forward rotation recess end face 414. At this point, the current draw for the motor rises sufficiently for the control system to cut power to the motor. Because the gear train is non back-drivable, the mirror head assembly 11 is held fixed in the position shown in FIG. 9F. It can only be manually moved forward again by application of sufficient force to the mirror head 12 to ride over the drive train detent forward rotation detent ramp 214 and forward rotation recess end face 414.

Electric fold out from the position shown in FIG. 9F back to the position shown in FIG. 9A is shown progressively in FIGS. 10A to 10F. Again, initially there is no slippage between the first and second clutch bodies 200 and 400. Once the position shown in FIG. 10C has been reached, slippage between the first and second clutch bodies 200 and 400 occurs as is progressively shown in FIGS. 10D to 10F.

Manual fold in of the mirror head 12 and mirror head assembly 11 will now be described with reference to FIGS. 11A to 11D. Because the drive train is non-back drivable, the manually applied force on the mirror head 12 translates to a torque from the locked together teeth of the worm gear 54 and the sun gear 56 around the axis of the sun gear 56 and causes the rearward rotation detent ramp 212 to ride up over the rearward rotation recess end face 412 as is shown in FIG.

Figure 11A:
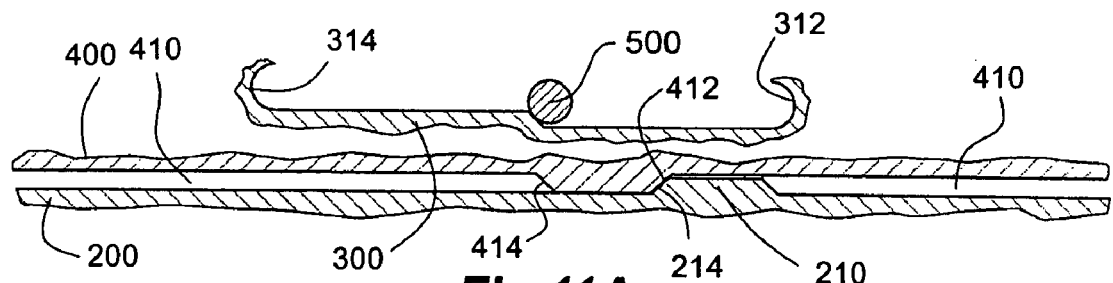
FIGS. 11A to 11D are similar to those of FIGS. 9A to 9F but show manual fold-in from a drive position to a park position.
Figure 11B:
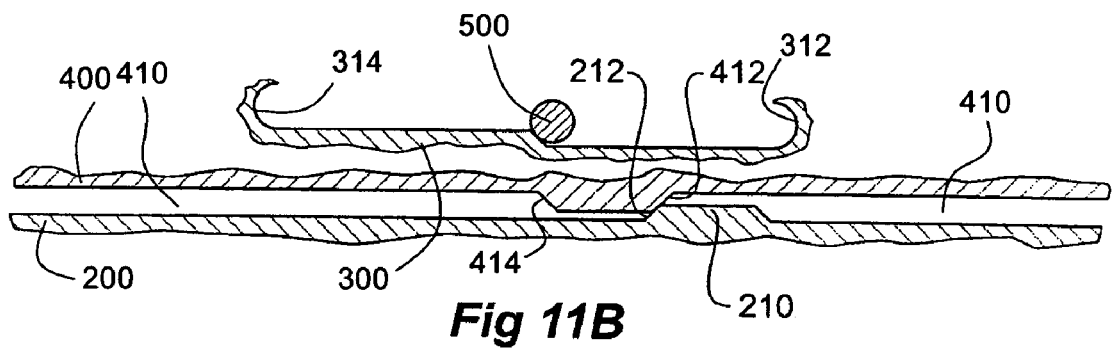
Figure 11C:
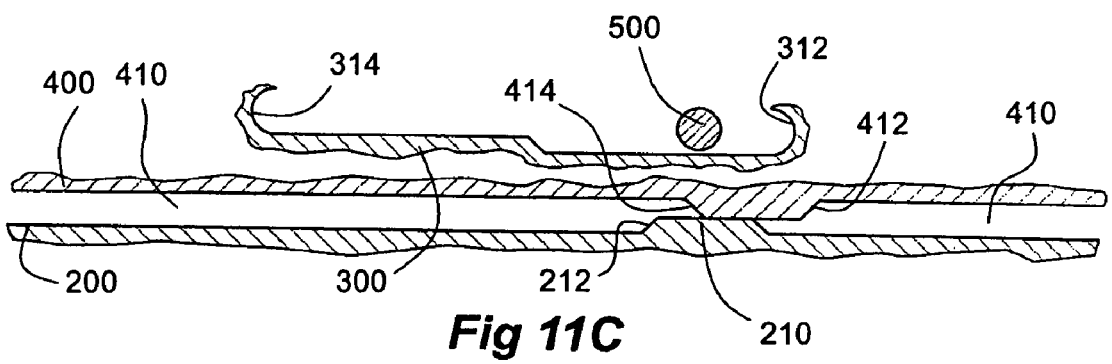

11B. Continued rotation is shown in FIG. 11C leading to the drive train detent being re-established as is shown in FIG. 11D.

Figure 11D:
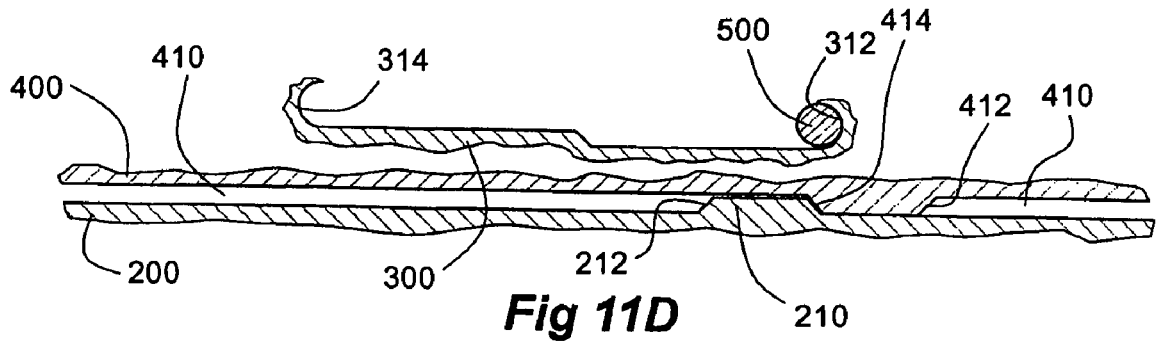
Figure 12A:
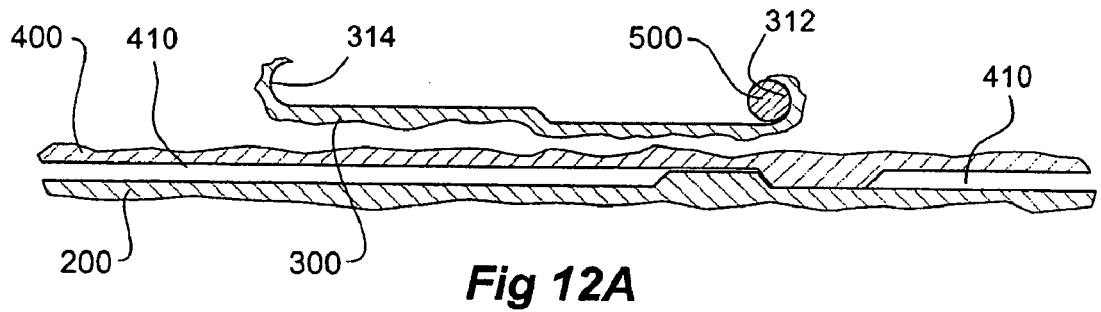
FIGS. 12A to 12D are similar to the FIGS. of 11A to 11D but show manual fold out from the park position to the drive position.
Figure 12B:
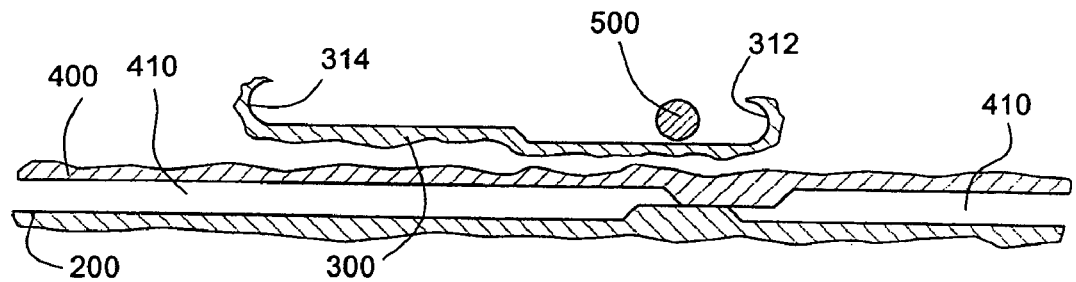
Figure 12C:
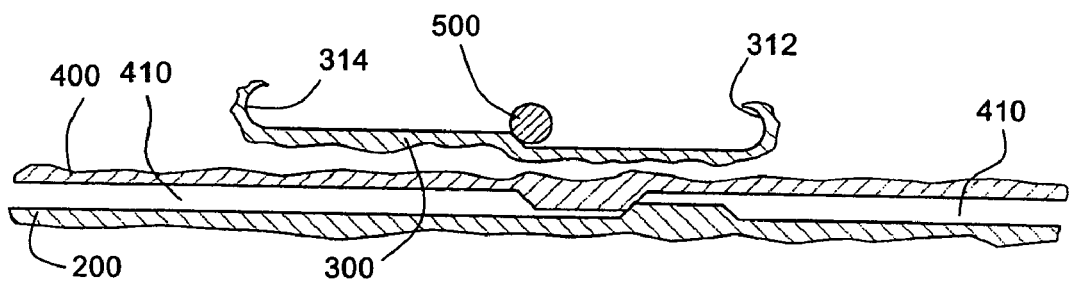
Figure 12D:
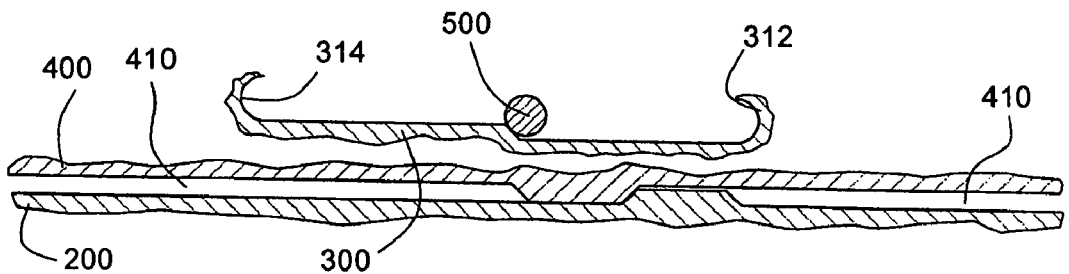
Figure 13A:
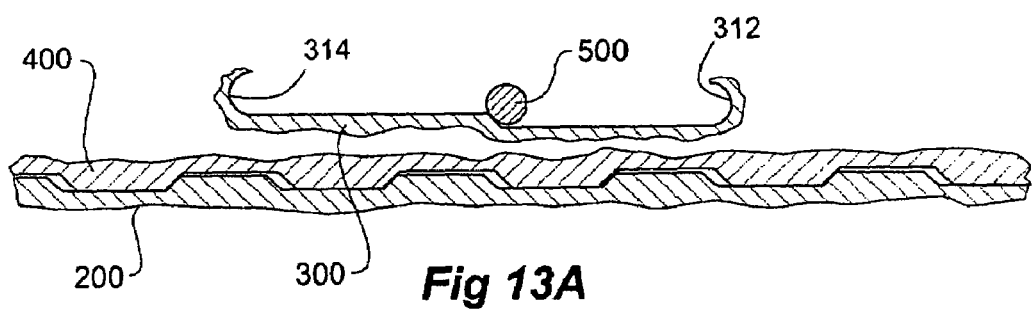
FIGS. 13A to 13E show schematically progressive electric fold in of the assembly shown in FIG. 8 utilising five sets of drive train detent recess and projection pairs, from a drive position (deploy position) to a park position.
Figure 13B:
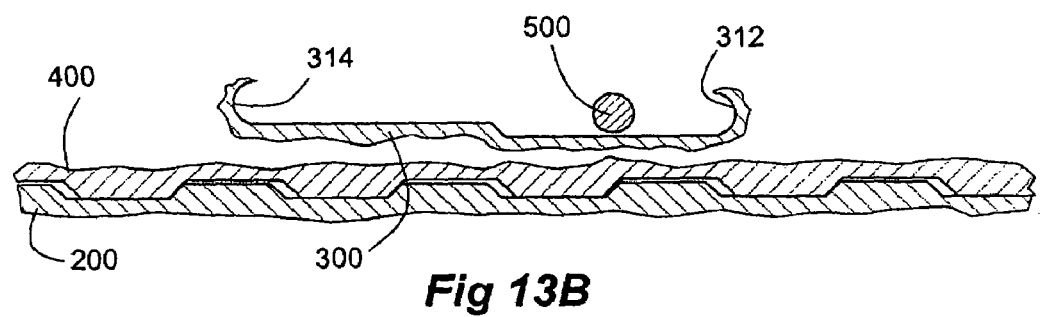
Figure 13C:
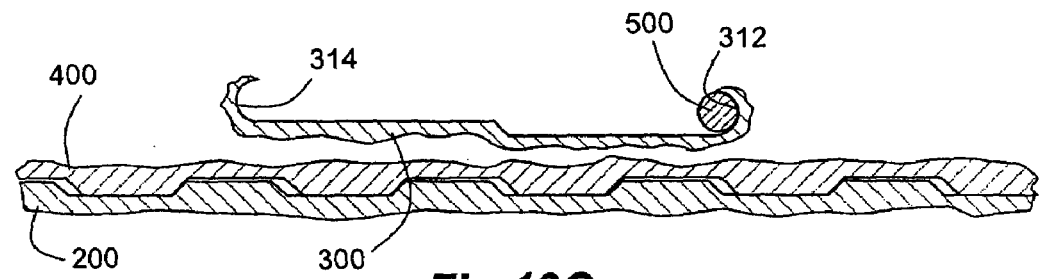
Figure 13D:
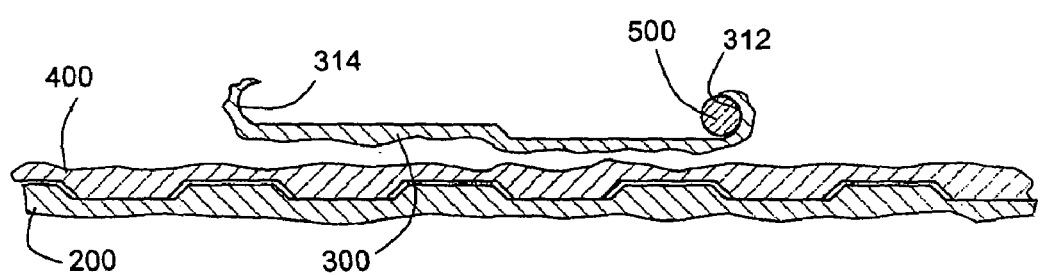
Figure 13E:
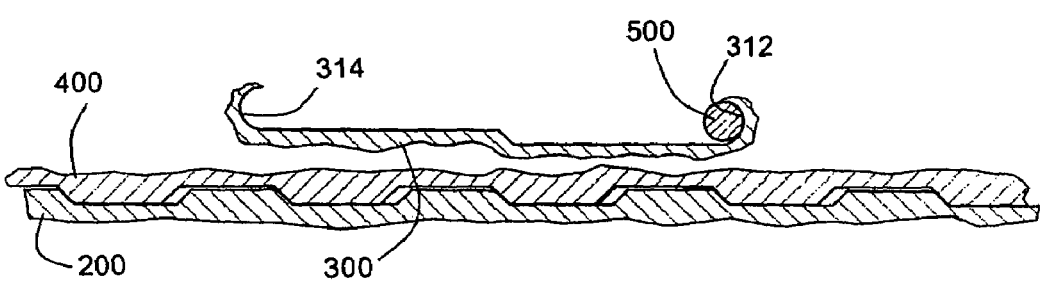
Figure 14A:
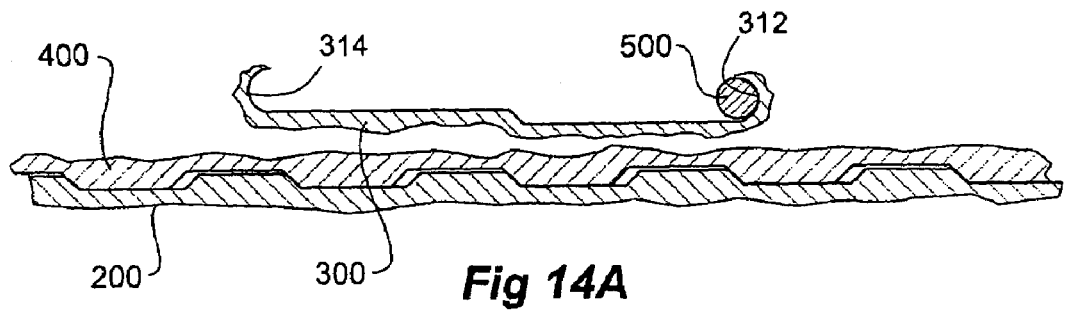
FIGS. 14A to 14E are similar to those of FIGS. 13A to 13E but schematically show progressive electric fold-out from the parked position to the drive position.
Figure 14B:
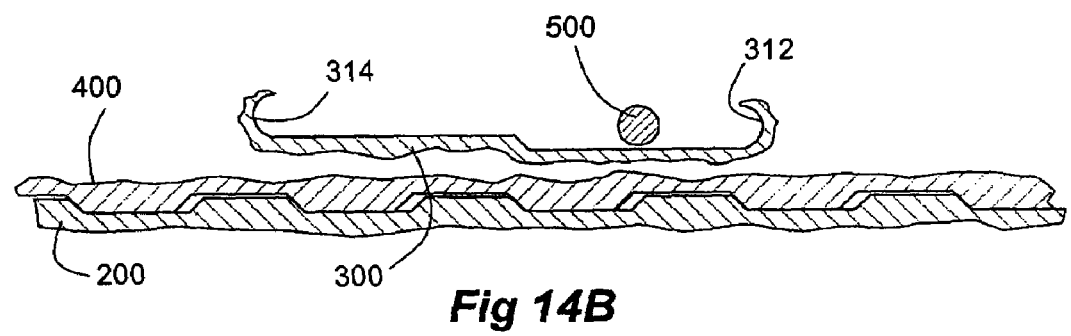
Figure 14C:
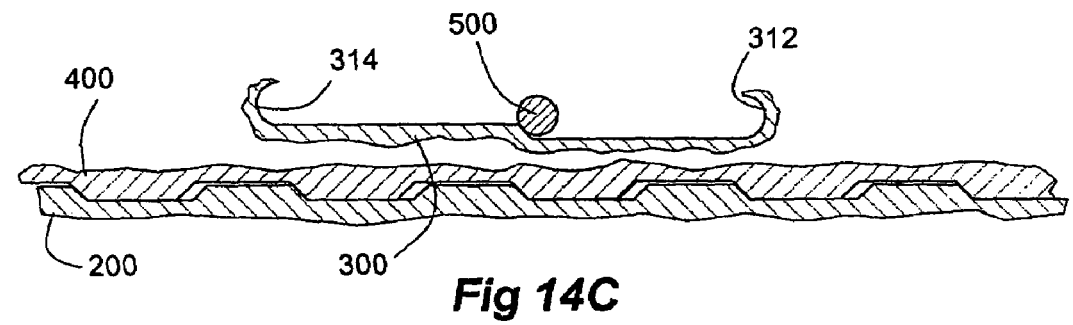
Figure 14D:
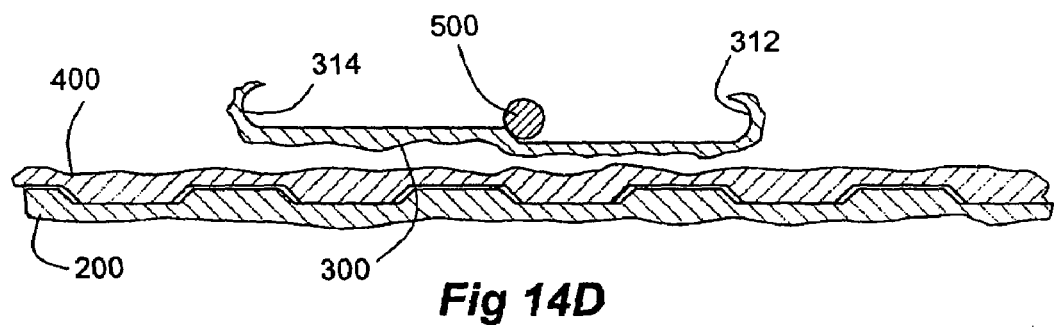
Figure 14E:
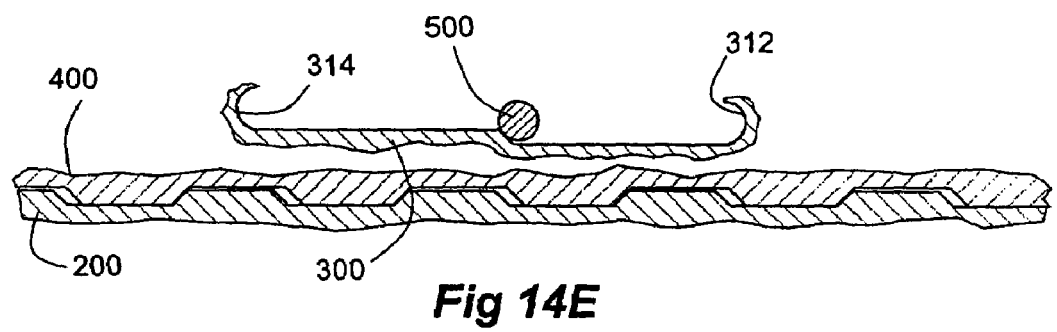
Figure 15A:
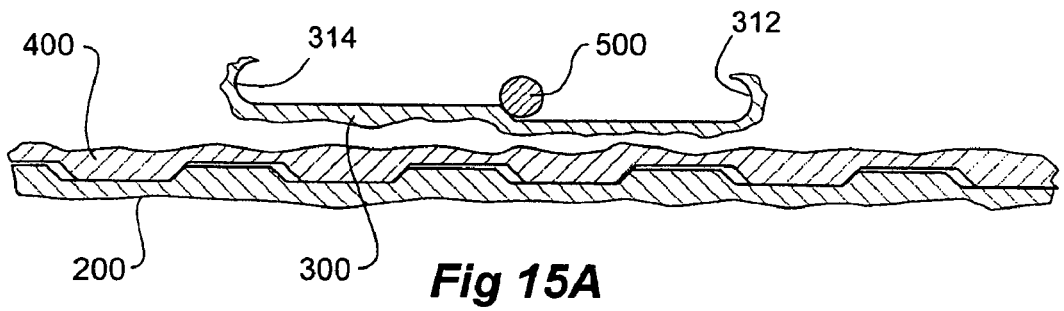
FIGS. 15A to 15D are similar to those of FIGS. 13A to 13E but schematically show manual fold-in from a drive position to a park position.
Figure 15B:
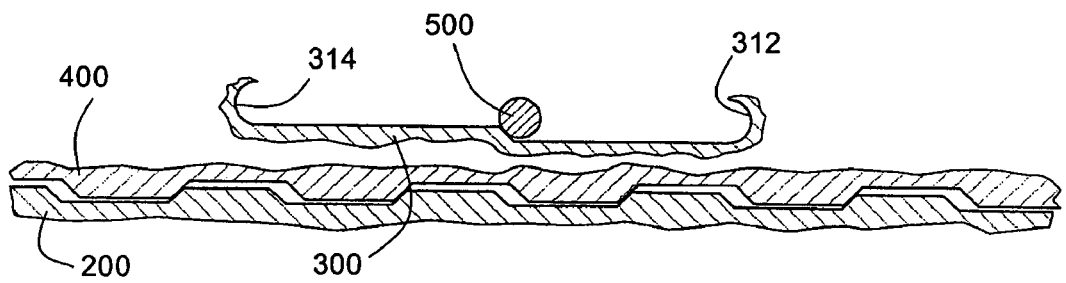
Figure 15C:
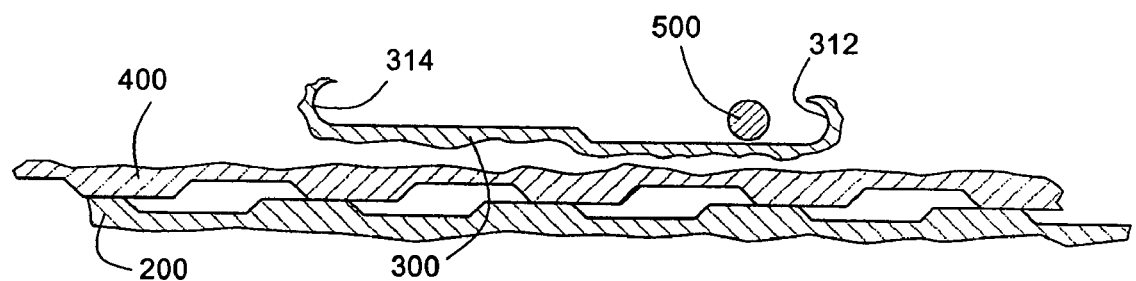
Figure 15D:
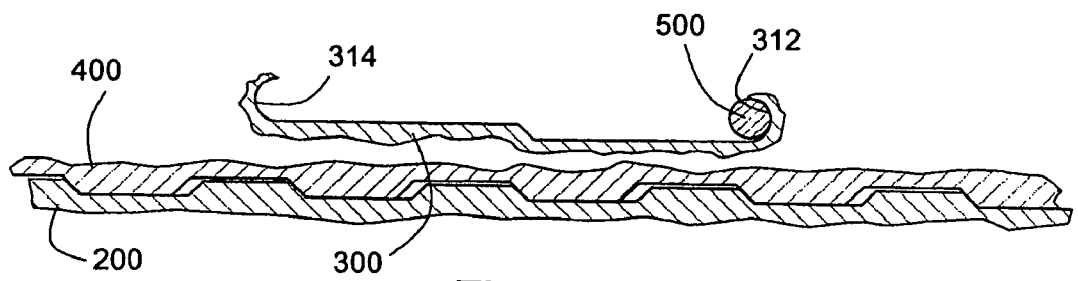
Figure 16A:
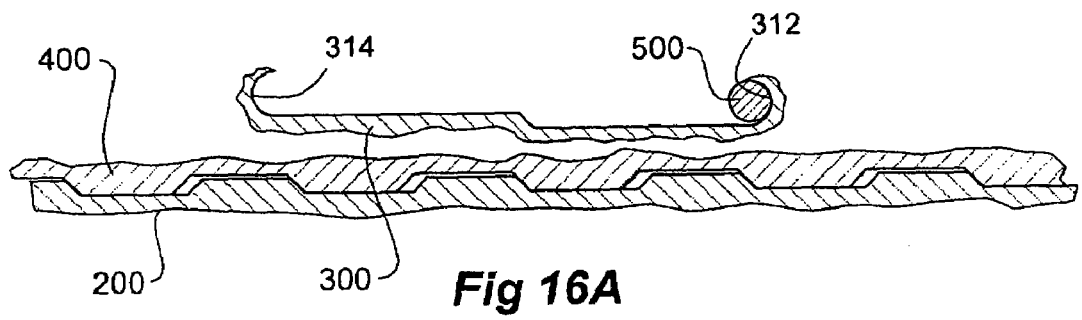
FIGS. 16A to 16D are similar to the FIGS. of 15A to 15D but schematically show manual fold out from the park position to the drive position.
Figure 16B:
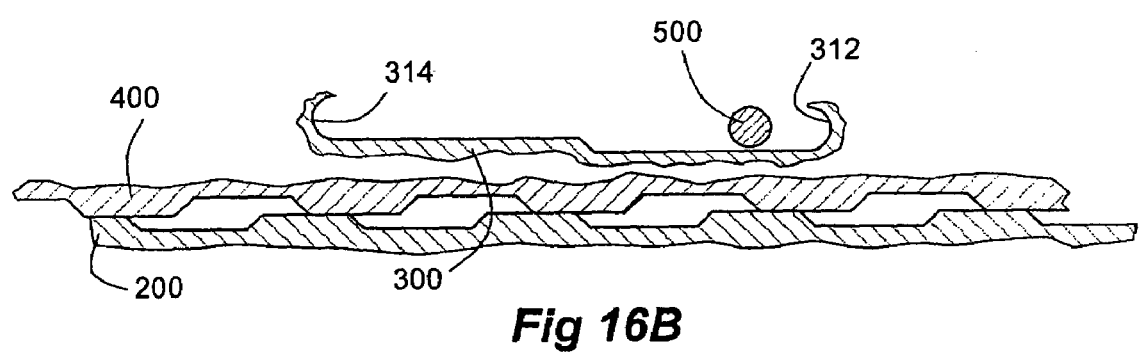
Figure 16C:
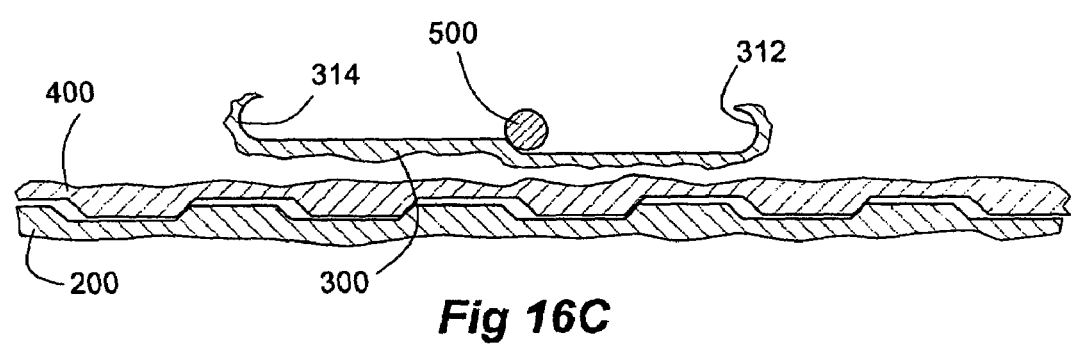
Figure 16D:
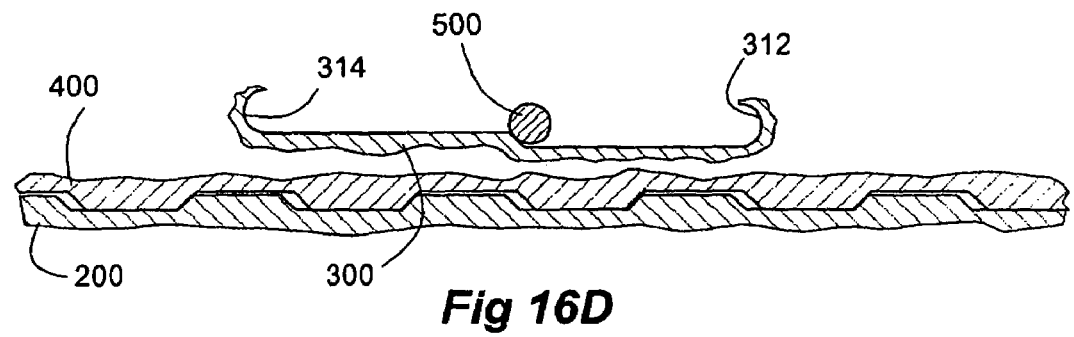

Manual fold out from the position shown in FIG. 11D is shown progressively in FIGS. 12A through to 12D.

The above-described drive train and head assembly to base detent systems provide a number of advantages over more conventional mirror detent systems. A significant advantage of the above described system is that it is easy to adapt the detent positions for mirrors to be used on the left or right hand side of vehicles. For example, 72 degrees rotation may be required between deploy and park positions on the driver's side of a vehicle and 60 degrees may be required for the passenger side of the vehicle.

In other embodiments of the invention, more than one detent ramp and recess pair may be provided. For instance, four pairs of detent ramps and recesses may be provided. If the recesses were not oversized relative to the projections, then the mirror head would only be positionable in positions 90 degrees apart (i.e., 360 divided by 4). By having an oversized recess according to the invention, it is possible to build the mechanism to provide detent to park angles of any desired angle. By using evenly spaced detents within the clutching mechanism, and by adding a delay zone between them, it is possible to change the park and deploy angle by changing the width angle of the detents and, furthermore, the mechanism can never become lost in an incorrect detent position if it is overridden manually (e.g., because of the even spacing).

A further example of the mechanism according to the invention is illustrated in FIGS. 13A to 13E, 14A to 14E, 15A to 15D and 16A to 16D. In these drawings, a mechanism is shown having five sets of drive train detent recess and projection pairs. A small delay zone is again provided.

More specifically, in FIGS. 13A to 13E there is shown schematically the progressive electric fold in of the assembly shown in FIG. 8 utilising five sets of drive train detent recess and projection pairs, from a drive position (deploy position) to a park position. FIGS. 14A to 14E are similar to those of FIGS. 13A to 13E but schematically show progressive electric fold-out from the parked position to the drive position. FIGS. 15A to 15D are similar to those of FIGS. 13A to 13E but schematically show manual fold-in from a drive position to a park position. FIGS. 16A to 16D are similar to the FIGS. of 15A to 15D but schematically show manual fold out from the park position to the drive position.

The delay zone described above has a further advantage in that it enables the designer to better control breakaway conditions in that operation of the drive train detents and the head assembly to body detent systems do not occur simultaneously.

With the embodiment of the invention illustrated in FIGS. 13A to 13E, it is possible to eliminate the delay zone thereby providing a rotation angle between deploy and park positions of exactly 72 degrees (i.e., 360 divided by 5). This may be suitable for some applications.

In other embodiments of the invention, not shown, the mirror head may only have two detent positions, one being a drive position and one being a parked position.

While the present invention has been described in terms of preferred embodiments in order to facilitate better understanding of the invention, it should be appreciated that various modifications can be made without departing from the principles of the invention. Therefore, the invention should be understood to include all such modifications within its scope.

What is claimed is:

1. A power-folding vehicle mirror assembly, comprising:
a base mountable to a vehicle;
 a mirror head assembly rotatably mounted to the base for rearward rotational movement from a drive position to a park position;
 a first clutch body mounted to and rotationally fixed with respect to the base;
 a second clutch body biased towards engagement with the first clutch body by a spring;
 a sun gear mounted to and rotatably fixed with respect to the base, wherein said sun gear is mounted to or integral with the second clutch body for rotation;
 a planetary gear mounted to the mirror head assembly for rotation about a second axis, the planetary gear meshing with the sun gear;
 a motor operably connected to the planetary gear thereby providing a gear train for driving the mirror head assembly around the sun gear, the gear train being non-back-drivable;
 at least one drive train detent recess and projection pair forming a drive train detent system, the projection extending from the first clutch body and the recess within the second clutch body, the projection comprising a back-to-back ramp pair, one of the ramps of the pair providing a rearward rotation detent and the other of the ramps of the pair providing a forward rotation detent, the recess bounded by a rearward rotation recess end face and a forward rotation recess end face, the recess oversized relative to the corresponding projection such that rotational slip can occur with changes in rotational direction of the first clutch body with respect to the second clutch body; and
 a head assembly to base detent system operably interposed between the head assembly and the base,
 wherein the mirror head is manually moveable and motor driven between:
  a drive position in which rearward rotation of the head assembly is restrained by the drive train detent system and forward rotation is restrained by the head assembly to base detent system;
  a park position in which forward rotation of the head assembly is restrained by the drive train detent system and rearward rotation is restrained by the head assembly to base detent system;
 an upper housing portion and a lower housing portion at least partially enclosing said motor, said sun gear, said first clutch and said second clutch, wherein said upper housing and said lower housing rotate with said mirror head; and
 a drive pin extending through said upper housing and said lower housing wherein said drive pin contacts one or more stops during rotation of said mirror head.

2. The invention as recited in claim 1, wherein, in the drive position, rearward rotation of the head assembly is restrained by the action of the rearward rotation recess end face against the rearward rotation detent ramp and forward rotation is restrained by the head assembly to base detent system; and
 in the park position, forward rotation of the head assembly is restrained by the action of the forward rotation recess end face against the forward rotation detent ramp and rearward rotation is restrained by the head assembly to base detent system.

3. The invention as recited in claim 2, wherein the head assembly to base detent system comprises:
 a drive position forward rotation detent face;
 a park position rearward rotation stop, the rearward rotation stop and the forward rotation detent face both dependent from either one of the head assembly or the base;
 a primary outer detent member having a front face engagable with the drive position forward rotation detent face; and
 a rear face of either the primary outer detent member or a secondary outer detent member, the rear face engagable with the park position rearward rotation stop in the park position, the outer detent member dependent from the other of the head assembly or the base,
 wherein the mirror head is manually moveable and motor driven between:
  the drive position, in which forward rotation is restrained by the action of the front face against the forward rotation detent face; and
  the park position, in which rearward rotation is restrained by the action of the rear face against the park position rearward rotation stop.

4. The invention as recited in claim 3, wherein the planetary gear is a worm gear.

5. The invention as recited in claim 4, further comprising at least four drive train detent recess and projection pairs, the detent pairs evenly angularly spaced around the first axis.

6. The invention as recited in claim 2, wherein the mirror head assembly is rotatably mounted to the base for forward rotational movement from the drive position to a front position, and wherein the head assembly to base detent system comprises:
 a drive position forward rotation detent face;
 a park position rearward rotation stop;
 a front position forward rotation stop, the forward rotation detent face, the rearward rotation stop and the forward rotation stop all dependent from either one of the head assembly or the base;
 a primary outer detent member having a front face engagable with the drive position forward rotation detent face; and
 a rear face of either the primary outer detent member or a secondary outer detent member, the rear face engagable with the park position rearward rotation stop in the park position, the outer detent member dependent from the other of the head assembly or the base,
 wherein the mirror head is manually moveable and motor moveable driven between:
  the drive position, in which forward rotation is restrained by the action of the front face against the forward rotation detent face; and
  the park position, in which rearward rotation is restrained by the action of the rear face against the park position rearward rotation stop.

7. The invention as recited in claim 6, wherein the planetary gear is a worm gear.

8. The invention as recited in claim 7, further comprising at least four drive train detent recess and projection pairs, the detent pairs evenly angularly spaced around the first axis.

9. A power-folding vehicle mirror assembly, comprising:
 a base mountable to a vehicle;
 a mirror head assembly rotatably mounted to the base for rearward rotational movement from a drive position to a park position;
 a first clutch body mounted to and rotationally fixed with respect to the base;
 a second clutch body biased towards engagement with the first clutch body by a spring;
 a sun gear mounted to and rotatably fixed with respect to the base, wherein said sun gear is mounted to or integral with the second clutch body for rotation;
 a planetary gear mounted to the mirror head assembly for rotation about a second axis, the planetary gear meshing with the sun gear;
 a motor operably connected to the planetary gear thereby providing a gear train for driving the mirror head assembly around the sun gear, the gear train being non-back-drivable;
 at least four drive train detent recess and projection pairs, the projections extending from the first clutch body and the recesses extending from the second clutch body, each projection comprising a back-to-back ramp pair, one of the ramps of the pair providing a rearward rotation detent and the other of the ramps of the pair providing a forward rotation detent, each recess bounded by a rearward rotation recess end face and a forward rotation recess end face, the detent pairs evenly angularly spaced around the first axis;
 an upper housing portion and a lower housing portion at least partially enclosing said motor, said sun gear, said first clutch and said second clutch, wherein said upper housing and said lower housing rotate with said mirror head; and
 a drive pin extending through said upper housing and said lower housing wherein said drive pin contacts one or more stops during rotation of said mirror head.

10. The invention as recited in claim 9, further comprising:
 a head assembly to base detent system operably interposed between the head assembly and the base,
 wherein the mirror head is manually moveable and motor driven between:
  a drive position, in which rearward rotation is restrained by the action of the rearward rotation recess end faces against the rearward rotation detent ramps and forward rotation is restrained by the head assembly to base detent system; and
   a park position, in which forward rotation is restrained by the action of the forward rotation recess end faces against the forward rotation detent ramps and rearward rotation is restrained by the head assembly to base detent system.

11. The invention as recited in claim 10, wherein the head assembly to base detent system comprises:
 a drive position forward rotation detent face;
 a park position rearward rotation stop, the rearward rotation stop and the forward rotation detent face both dependent from either one of the head assembly or the base;
 a primary outer detent member having a front face engagable with the drive position forward rotation detent face; and
 a rear face of either the primary outer detent member or a secondary outer detent member, the rear face engagable with the park position rearward rotation stop in the park position, the outer detent member dependent from the other of the head assembly or the base,
 wherein the mirror head is manually moveable between:
  the drive position, in which forward rotation is restrained by the action of the front face against the forward rotation detent face; and the park position, in which rearward rotation is restrained by the action of the rear face against the park position rearward rotation stop.

12. The invention as recited in claim 11, wherein the planetary gear is a worm gear.

13. The invention as recited in claim 10, wherein the mirror head assembly is rotatably mounted to the base for forward rotational movement from the drive position to a front position, and wherein the head assembly to base detent system comprises:
   a drive position forward rotation detent face;
   a park position rearward rotation stop;
   a front position forward rotation stop, the forward rotation detent face, the rearward rotation stop and the forward rotation stop all dependent from either one of the head assembly or the base;
   a primary outer detent member having a front face engagable with the drive position forward rotation detent face; and
   a rear face of either the primary outer detent member or a secondary outer detent member, the rear face engagable with the park position rearward rotation stop in the park position, the outer detent member dependent from the other of the head assembly or the base,
   wherein the mirror head is manually moveable and motor moveable driven between:
      the drive position, in which forward rotation is restrained by the action of the front face against the forward rotation detent face; and
      the park position, in which rearward rotation is restrained by the action of the rear face against the park position rearward rotation stop.

14. The invention as recited in claim 13, wherein the planetary gear is a worm gear.

15. A power-folding vehicle mirror assembly, comprising:
   a base mountable to a vehicle;
   a mirror head assembly rotatably mounted to the base for rearward rotational movement from a drive position to a park position;
   a first clutch body mounted to and rotationally fixed with respect to the base;
   a second clutch body biased towards engagement with the first clutch body by a spring;
   a sun gear mounted to and rotatably fixed with respect to the base wherein said sun gear is mounted to or integral with the second clutch body for rotation;
   a planetary gear mounted to the mirror head assembly for rotation about a second axis, the planetary gear meshing with the sun gear;
   a motor operably connected to the planetary gear thereby providing a gear train for driving the mirror head assembly around the sun gear, the gear train being non-back-drivable;
   at least four drive train detent recess and projection pairs, the projections extending from the first clutch body and the recesses extending from the second clutch body, each projection comprising a back-to-back ramp pair, one of the ramps of the pair providing a rearward rotation detent and the other of the ramps of the pair providing a forward rotation detent, each recess bounded by a rearward rotation recess end face and a forward rotation recess end face, the detent pairs evenly angularly spaced around the first axis,
   wherein the or each recess is oversized relative to the/their corresponding projection such that rotational slip can occur with changes in rotational direction of the first clutch body with respect to the second clutch body;
   an upper housing portion and a lower housing portion at least partially enclosing said motor, said sun gear, said first clutch and said second clutch, wherein said upper housing and said lower housing rotate with said mirror head; and
   a drive pin extending through said upper housing and said lower housing wherein said drive pin contacts one or more stops during rotation of said mirror head.

16. The invention as recited in claim 15, further comprising:
   a head assembly to base detent system operably interposed between the head assembly and the base,
   wherein the mirror head is manually moveable and motor driven between:
      a drive position, in which rearward rotation is restrained by the action of the rearward rotation recess end faces against the rearward rotation detent ramps and forward rotation is restrained by the head assembly to base detent system; and
      a park position, in which forward rotation is restrained by the action of the forward rotation recess end faces against the forward rotation detent ramps and rearward rotation is restrained by the head assembly to base detent system.

17. The invention as recited in claim 16, wherein the head assembly to base detent system comprises:
   a drive position forward rotation detent face;
   a park position rearward rotation stop, the rearward rotation stop and the forward rotation detent face both dependent from either one of the head assembly or the base;
   a primary outer detent member having a front face engagable with the drive position forward rotation detent face; and
   a rear face of either the primary outer detent member or a secondary outer detent member, the rear face engagable with the park position rearward rotation stop in the park position, the outer detent member dependent from the other of the head assembly or the base,
   wherein the mirror head is manually moveable and motor driven between:
      the drive position, in which forward rotation is restrained by the action of the front face against the forward rotation detent face; and
      the park position, in which rearward rotation is restrained by the action of the rear face against the park position rearward rotation stop.

18. The invention as recited in claim 17, wherein the planetary gear is a worm gear.

19. The invention as recited in claim 16, wherein the mirror head assembly is rotatably mounted to the base for forward rotational movement from the drive position to a front position, and wherein the head assembly to base detent system comprises:
   a drive position forward rotation detent face;
   a park position rearward rotation stop;
   a front position forward rotation stop, the forward rotation detent face, the rearward rotation stop and the forward rotation stop all dependent from either one of the head assembly or the base;
   a primary outer detent member having a front face engagable with the drive position forward rotation detent face; and
   a rear face of either the primary outer detent member or a secondary outer detent member, the rear face engagable with the park position rearward rotation stop in the park position, the outer detent member dependent from the other of the head assembly or the base, wherein the mirror head is manually moveable and motor moveable between:

the drive position, in which forward rotation is restrained by the action of the front face against the forward rotation detent face; and the park position, in which rearward rotation is restrained by the action of the rear face against the park position rearward rotation stop.

20. The invention as recited in claim 19, wherein the planetary gear is a worm gear.

* * * * *